(12) United States Patent
Tamura et al.

(10) Patent No.: US 7,050,434 B2
(45) Date of Patent: May 23, 2006

(54) DIGITAL TRANSMISSION APPARATUS FOR TRANSMITTING ASYNCHRONOUS FRAMES BY ACCOMODATING THEM IN SYNCHRONOUS FRAMES

(75) Inventors: Nobuyuki Tamura, Yokohama (JP);
Hiroaki Nagao, Kawasaki (JP);
Sotohiro Kobayashi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 943 days.

(21) Appl. No.: 10/079,125

(22) Filed: Feb. 19, 2002

(65) Prior Publication Data

US 2003/0081606 A1    May 1, 2003

(30) Foreign Application Priority Data

Oct. 31, 2001  (JP) ............................. 2001-333735

(51) Int. Cl.
*H04L 12/28* (2006.01)
*H04J 3/24* (2006.01)
(52) U.S. Cl. ...................... 370/392; 370/474
(58) Field of Classification Search ............... None
See application file for complete search history.

(56) References Cited

U.S. PATENT DOCUMENTS 6,052,386 A * 4/2000 Achilleoudis et al. ...... 370/470
6,243,380 B1 * 6/2001 Malkin ....................... 370/392

* cited by examiner

*Primary Examiner*—Duc Ho
(74) *Attorney, Agent, or Firm*—Katten Muchin Rosemann LLP

(57) ABSTRACT

A digital transmission apparatus, which accommodates a plurality of terminals for exchanging asynchronous frames each including a MAC address, and is used for transmitting the asynchronous frames by putting each of the asynchronous frames in a synchronous frame, includes an address table for storing an address of a group including the digital transmission apparatus, a header-creating unit for creating a header including a communication-destination transmission-apparatus identification including an address of a group including the digital transmission apparatus and a header-adding unit for creating a first frame by adding the header to data of an asynchronous frame received from any one of the terminals.

8 Claims, 17 Drawing Sheets

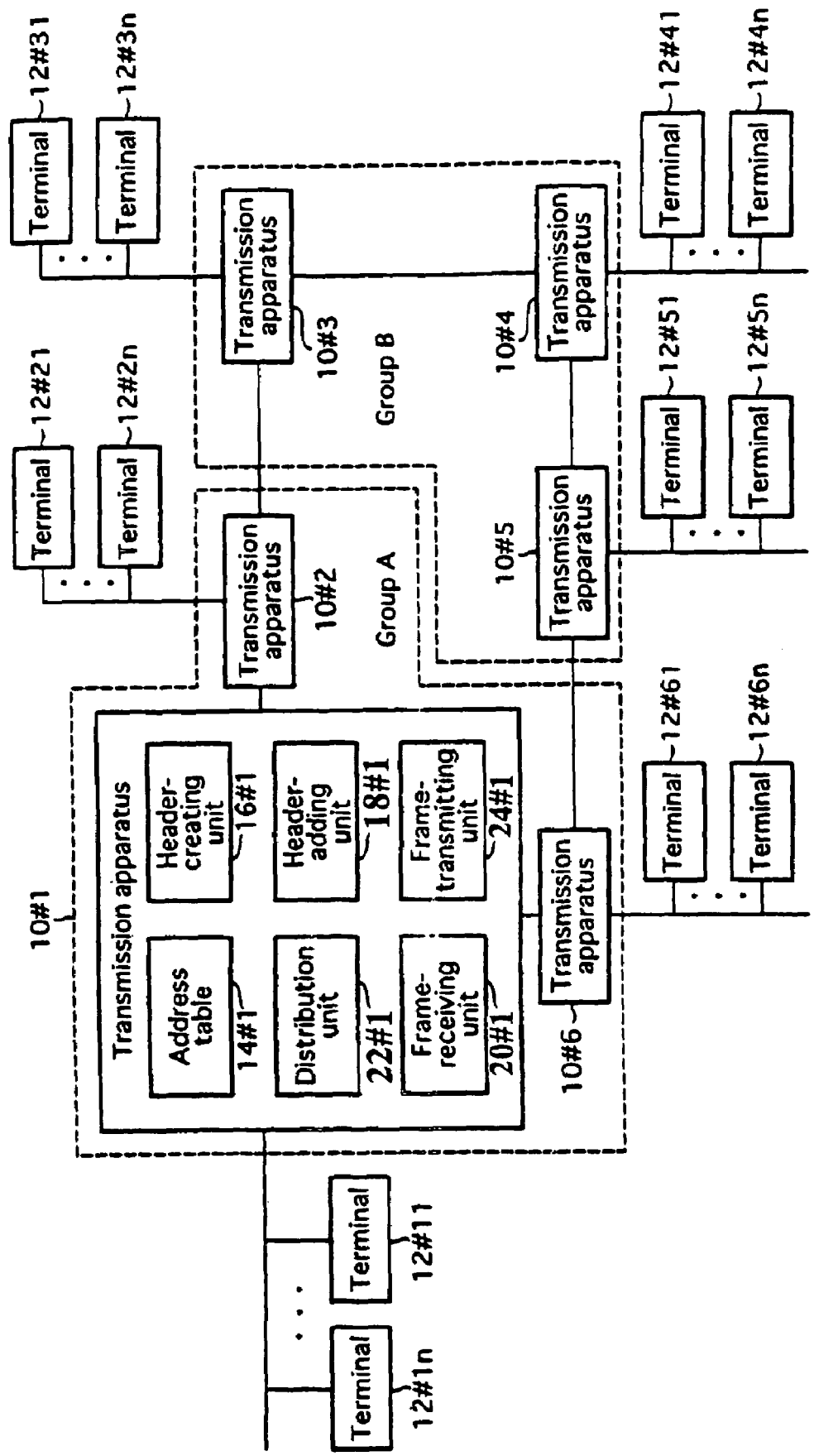

FIG. 5

| Terminal MAC address | Transmission-apparatus identification | |
|---|---|---|
| 00:00:00:11:11:00 | 1110 | 000010 |
| 00:00:00:11:11:22 | 1110 | 000010 |
| 00:00:00:11:11:33 | 1110 | 000011 |
| CC:DD:EE:FF:00:11 | 1110 | 000011 |
| 22:33:44:55:66:77 | 1101 | 000010 |

F I G. 7

Specifying specific transmission apparatus

******** : **∼** (where * is a bit value)

Specifying all transmission apparatus in group

********** : 111111∼1111

Specifying specific address of transmission apparatus in same or other group

1111∼1111 : ****∼**

F I G. 1 2
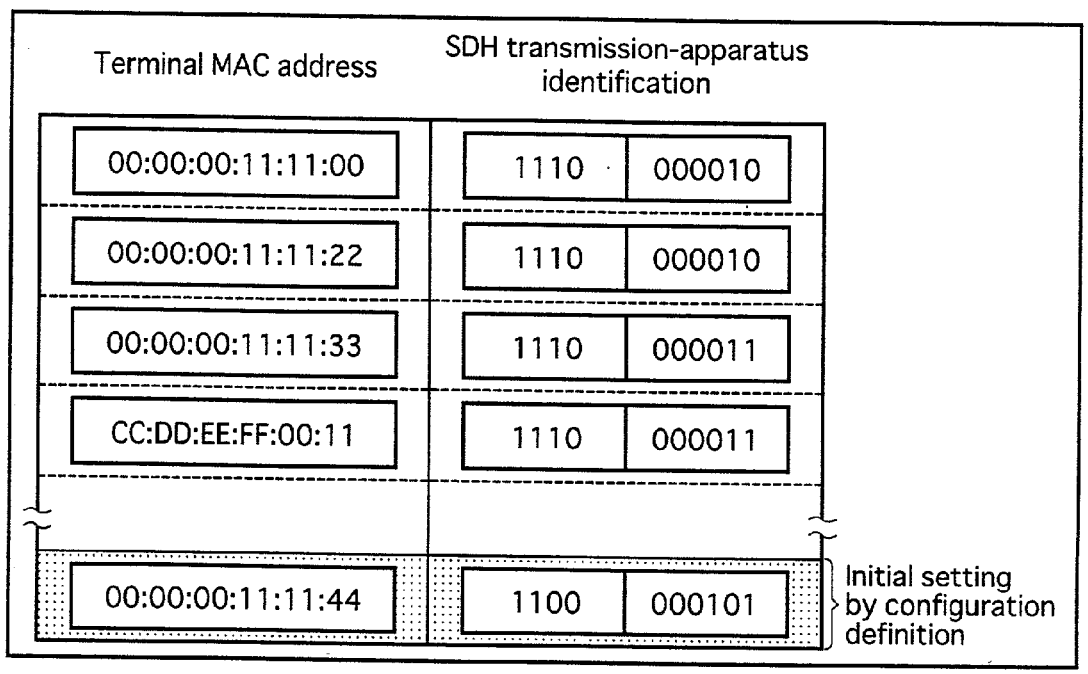

F I G. 1 4
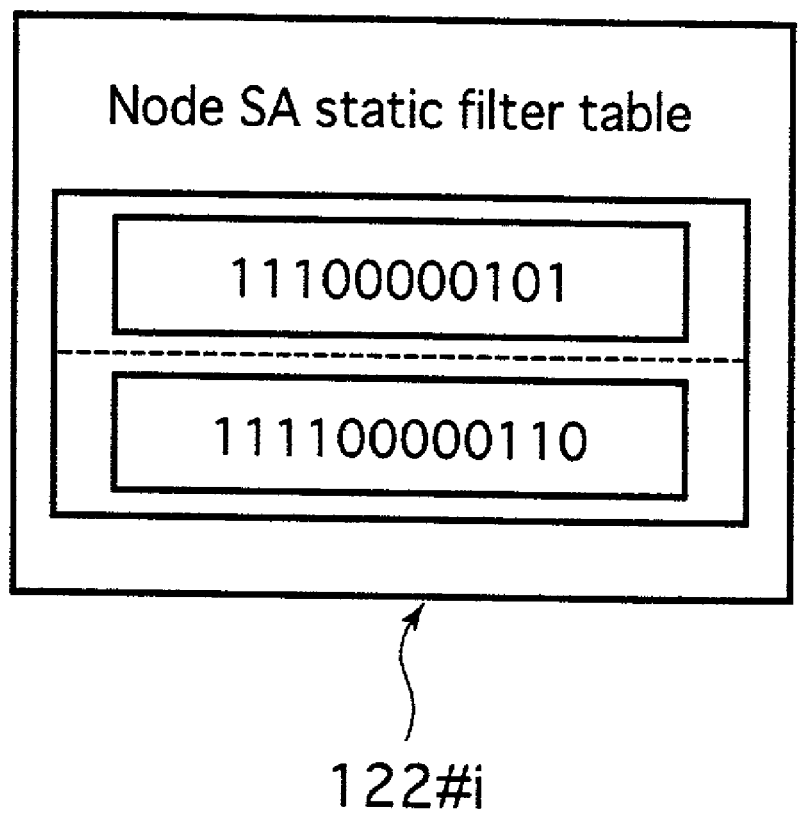

DIGITAL TRANSMISSION APPARATUS FOR TRANSMITTING ASYNCHRONOUS FRAMES BY ACCOMODATING THEM IN SYNCHRONOUS FRAMES

BACKGROUND OF THE INVENTION

1. Field of the Invention

The present invention relates to a digital transmission apparatus and, more particularly, relates to construction of a VLAN for carrying out communications between groups in an asynchronous network using digital transmission apparatuses.

2. Description of the Related Art

In an asynchronous network such as the Ethernet and an enterprise network using SDH (Synchronous Digital Hierarchy) apparatuses and the like, a VLAN is constructed. FIG. 16 is a diagram showing typical construction of a VLAN in an Ethernet. As shown in FIG. 16, in an asynchronous network such as the Ethernet, terminals 2#Ai where i=1, 2 and so on form group A whereas terminals 2#Bi where i=1, 2 and so on form group B. Groups A and B generally implement the VLAN as follows. For each network, in a bridge serving as a data-outputting source or a router 4#i where i=1, 2 and so on, a group identification such as a VLAN-Tag is assigned to an IP or MAC frame. In a bridge or a router 4#i where i=1, 2 and so on provided on the data reception side, on the other hand, an IP or MAC frame other than its own group is discarded to make exchanges of data with groups other than its own group impossible.

FIG. 17 is a diagram showing typical construction of a VLAN in a synchronous network using SDH transmission apparatuses. In a synchronous network using SDH transmission apparatuses and the like wherein terminals 2#Ai where i=1, 2 and so on form group A whereas terminals 2#Bi where i=1, 2 and so on form group B, and a VLAN is implemented by using groups A and B, communication path A in group A and communication path B in group B set the same band. The SDH transmission apparatuses 4#i where i=1, 2 and so on each carry out cross connection in a band assigned to the path in accordance with path setting to enable only communications within the same group. However, the conventional construction of a VLAN has the following problems:

1: In an attempt made to accommodate a plurality of asynchronous networks such as the Ethernet in groups including SDH transmission apparatuses, it is necessary to set a path for each group. It is thus necessary to assign maximum bands to as many pathes as the groups so that wasteful bands are acquired inadvertently.

2: When a plurality of asynchronous networks such as the Ethernet are accommodated in an SDH transmission apparatus using a path, it is necessary to separately provide a routing apparatus such as a bridge or a router for adding and deleting a tag to and from data on the path between the SDH transmission apparatus and an asynchronous network for each group. Thus, implementation of the network requires a high additional cost.

3: In an attempt to implement a communication between different groups with a routing apparatus such as a router or a bridge setting a tag for each group, it is necessary to add a plurality of group tags so that management of groups becomes difficult.

4: An attempt to carry out a communication between groups in an SDH transmission apparatus entails a mechanism for carrying out operations including extraction of only necessary data from received data and transmission of the extracted data to another path after incoming data is received. Thus, the cost of the apparatus increases.

SUMMARY OF THE INVENTION

It is thus an object of the present invention addressing the problems described above to provide a digital transmission apparatus capable of carrying out communications between groups without wasting bands.

In accordance with an aspect of the present invention, there is provided a digital transmission apparatus, which accommodates a plurality of terminals for exchanging asynchronous frames each including a MAC address, and is used for transmitting the asynchronous frames by putting each of the asynchronous frames in a synchronous frame, comprising, an address table for storing an address of a group including the digital transmission apparatus, a header-creating unit for creating a header including a communication-destination transmission-apparatus identification including the address of the group including the digital transmission apparatus, a header-adding unit for creating a first frame by adding the header to data of an asynchronous frame received from any one of the terminals, a frame-receiving unit for receiving a synchronous frame, a distribution unit for extracting a first frame from a synchronous frame received by the frame-receiving unit, comparing a communication-destination transmission-apparatus identification included in a header of the first frame with the address of the group including the digital transmission apparatus and forming a judgment as to whether to relay or accept the first frame in dependence on a result of comparison and a frame-transmitting unit for transmitting a first frame created by the header-adding unit or passed on by the distribution unit by putting the first frame in a synchronous frame.

It is desirable to provide the digital transmission apparatus with a MAC-address-learning unit for storing a relation between a communication-destination MAC address and a transmission-apparatus identification on the basis of a communication-source transmission-apparatus identification and a communication-source MAC address, which are included in a first frame put in a synchronous frame received by the frame-receiving unit.

It is also desirable to further provide the digital transmission apparatus with an unsuccessful-search-case address table for storing an unsuccessful-search-case transmission-apparatus identification to be used when it is impossible to search for a group address and a node address, which correspond to a MAC address, wherein the header-creating unit uses a transmission-apparatus identification stored in the unsuccessful-search-case address table in case it is impossible to search for a group address and a node address, which correspond to a MAC address.

In accordance with another aspect of the present invention, there is provided a digital transmission apparatus, which accommodates a plurality of terminals for exchanging asynchronous frames each including a MAC address, and is used for transmitting the asynchronous frames by putting each of the asynchronous frames in a synchronous frame, including, a MAC-address table for storing a MAC address of a terminal by associating the MAC address with an address of a group including a digital transmission apparatus accommodating the terminal and a node address of the digital transmission apparatus accommodating the terminal, a MAC-DA-address-extracting unit for extracting a communication-destination MAC address set in a MAC header of an asynchronous frame received from any one of the terminals, an address-detecting unit for searching the MAC-address table for a group address and a node address that match the communication-destination MAC address, an address table for storing the address of the group including the digital transmission apparatus and a node address of the digital transmission apparatus, a header-creating unit for determining a group address of the group including the digital transmission apparatus and a node address indicating a multiple-address communication in the group for a communication-destination MAC address indicating a multiple-address communication or for determining a group address and a node address that match a communication-destination MAC address for a communication-destination MAC address indicating a 1-to-1 communication and for setting the determined group address and the determined node address in a communication-source transmission-apparatus identification including a communication-source group address and a communication-source node address included in a header, a header-adding unit for creating a first frame by adding the header to data of an asynchronous frame received from any one of the terminals, a frame-receiving unit for receiving a synchronous frame, distribution unit for extracting a first frame from a synchronous frame received by the frame-receiving unit, comparing a communication-destination transmission-apparatus identification included in a header of the first frame with the address of the group including the digital transmission apparatus and forming a judgment as to whether to relay or accept the first frame in dependence on a result of comparison and a frame-transmitting unit for transmitting a first frame created by the header-adding unit or passed on by the distribution unit by putting the first frame in a synchronous frame.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 1 is a block diagram showing the principle of the present invention;

FIG. 5 is a diagram showing the configuration of a node-address CAM table used in the transmission apparatus shown in FIG. 3;

FIG. 7 is a diagram showing a method of specifying the identification of a DA transmission apparatus;

FIG. 12 is a diagram showing the configuration of a node-address learning table used in the transmission apparatus shown in FIG. 11;

FIG. 14 is a diagram showing the configuration of a node SA static filter table used in the transmission apparatus shown in FIG. 11;

DETAILED DESCRIPTION OF THE PREFERRED EMBODIMENTS

Figure 2:
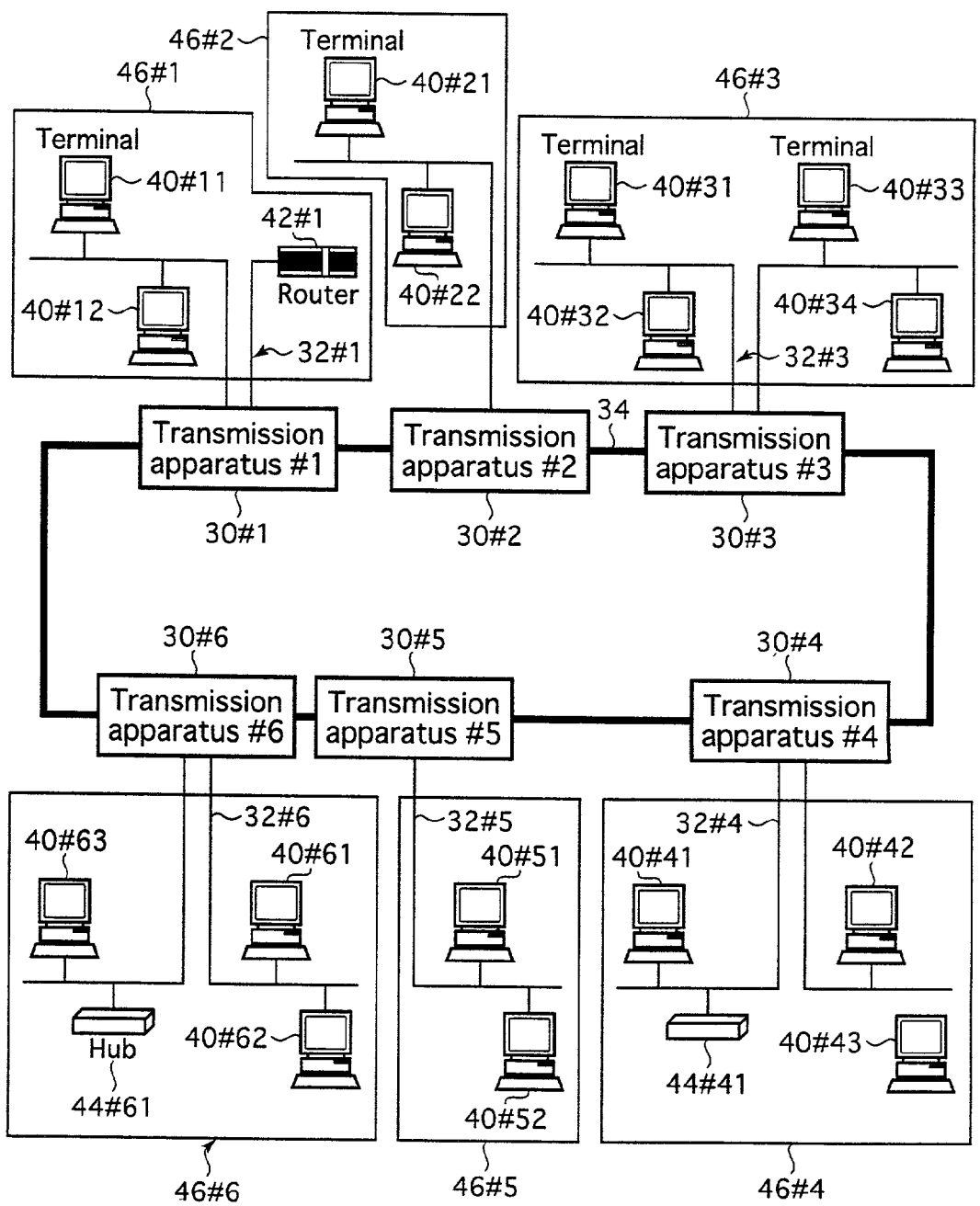
FIG. 2 is a block diagram showing the configuration of a transmission network implemented by a first embodiment of the present invention.

Before some preferred embodiments of the present invention are explained, the principle of the present invention is described. FIG. 1 is a block diagram showing the principle of the present invention. As shown in FIG. 1, a transmission network typically has a linked configuration comprising a plurality of transmission apparatuses 10#i where i=1 to n. The transmission apparatuses 10#i where i=1, 2 and so on each accommodate a plurality of terminals 12#ij where j=1, 2 and so on. The terminals 12#ij each interface with asynchronous frames. The transmission apparatuses 10#i each comprise an address table 14#i, a header-creating unit 16#i, a header-adding unit 18#i, a frame-receiving unit 20#i, a distribution unit 22#i and a frame-transmitting unit 24#i. The transmission network includes a plurality of defined groups, which each serve as a VLAN configuration unit. For example, the transmission apparatuses 10#1, 10#2 and 10#6 form group A whereas the transmission apparatuses 10#3, 10#4 and 10#5 form group B. A group address is assigned to each of groups A and B. Each of the address tables 14#i where i=1, 2 and so on contain a group address assigned to a group including a transmission apparatus 10#i using the address table 14#i.

Assume that the terminal 12#11 carries out a communication between groups. To be more specific, the terminal 12#11 transmits an asynchronous frame for the communication between groups. In this case, the header-creating unit 16#1 creates a header including the identification of a transmission apparatus to which the asynchronous frame is transmitted. The identification includes the address of group A to which the terminal 12#11 pertains. The header-adding unit 18#1 adds a header to data of an asynchronous frame transmitted from the terminal 12#11, creating a first frame. The frame-transmitting unit 24#1 puts the first frame in a synchronous frame and transmits the synchronous frame to the transmission apparatus 10#2. The frame-receiving unit 20#2 employed in the transmission apparatus 10#2 receives the synchronous frame. The distribution unit 22#2 extracts the first frame from the synchronous frame received by the frame-receiving unit 20#2, and compares a communication-destination transmission-apparatus identification included in the header of the first frame with the address of a group to which the transmission apparatus 10#2 pertains. Since the communication-destination transmission-apparatus identification is the same as the address of the group to which the transmission apparatus 10#2 pertains, a decision is made to accept and relay the first frame. The frame-transmitting unit 24#2 accommodates the first frame in a synchronous frame and transmits the synchronous frame to the transmission apparatus 10#3.

The frame-receiving unit 20#3 employed in the transmission apparatus 10#3 receives the synchronous frame. The distribution unit 22#3 extracts the first frame from the synchronous frame received by the frame-receiving unit 20#3, and compares a communication-destination transmission-apparatus identification included in the header of the first frame with the address of a group to which the transmission apparatus 10#3 pertains. Since the communication-destination transmission-apparatus identification is different from the address of the group to which the transmission apparatus 10#2 pertains, a decision is made to relay the first frame. The frame-transmitting unit 24#3 puts the first frame in a synchronous frame and transmits the synchronous frame to the transmission apparatus 10#4.

Much like the transmission apparatus 10#3, the transmission apparatus 10#4 relays a synchronous frame to the transmission apparatus 10#5 and the transmission apparatus 10#5 relays a synchronous frame to the transmission apparatus 10#6. This is because the communication-destination transmission-apparatus identification is different from the address of the group to which the synchronous frame is transmitted. Much like the transmission apparatus 10#2, the transmission apparatus 10#6 accepts the synchronous frame. This is because the communication-destination transmission-apparatus identification is the same as the address of the group to which the transmission apparatus 10#6 pertains. In this way, a communication between groups can be carried out at a lower cost by using the transmission apparatuses 10#i where i=1, 2 and so on.

First Embodiment

FIG. 2 is a block diagram showing the configuration of a transmission network implemented by a first embodiment of the present invention. As shown in FIG. 2, the transmission network comprises a plurality of transmission apparatuses 30#i where i=1, 2 and so on, synchronous transmission lines 34 for connecting the transmission apparatuses 30#i to each other and asynchronous transmission lines 32 for connecting the transmission apparatuses 30#i to pieces of Ethernet-interface equipment. Each of the transmission apparatuses 30#i is an SDH apparatus for accommodating a LAN 46#i comprising Ethernet-interface equipment such as terminals 40#ij, routers 42#ij and hubs 44#ij as will be described later. Each of the asynchronous transmission lines 32#i is a transmission medium for transmitting a MAC frame. An asynchronous transmission line 32#i can thus be 10BASE-5, 10BASE-2, 10BASE-T or the like. On the other hand, each of the synchronous transmission lines 34#i is a transmission medium for transmitting an SDH frame. A synchronous transmission line 34#i is thus typically an optical fiber. Each of the terminals 40#ij is typically a personal computer (PC) for interfacing with a MAC frame. A router 42#ij routes an IP packet. The hubs 44#ij are each a repeater for relaying a MAC frame. The terminals 40#ij where j=1, 2 and so on, the routers 42#ij where j=1, 2 and so on and the hubs 44#ij where j=1, 2 and so on form a LAN (Local Area Network) 46#i.

Figure 3:
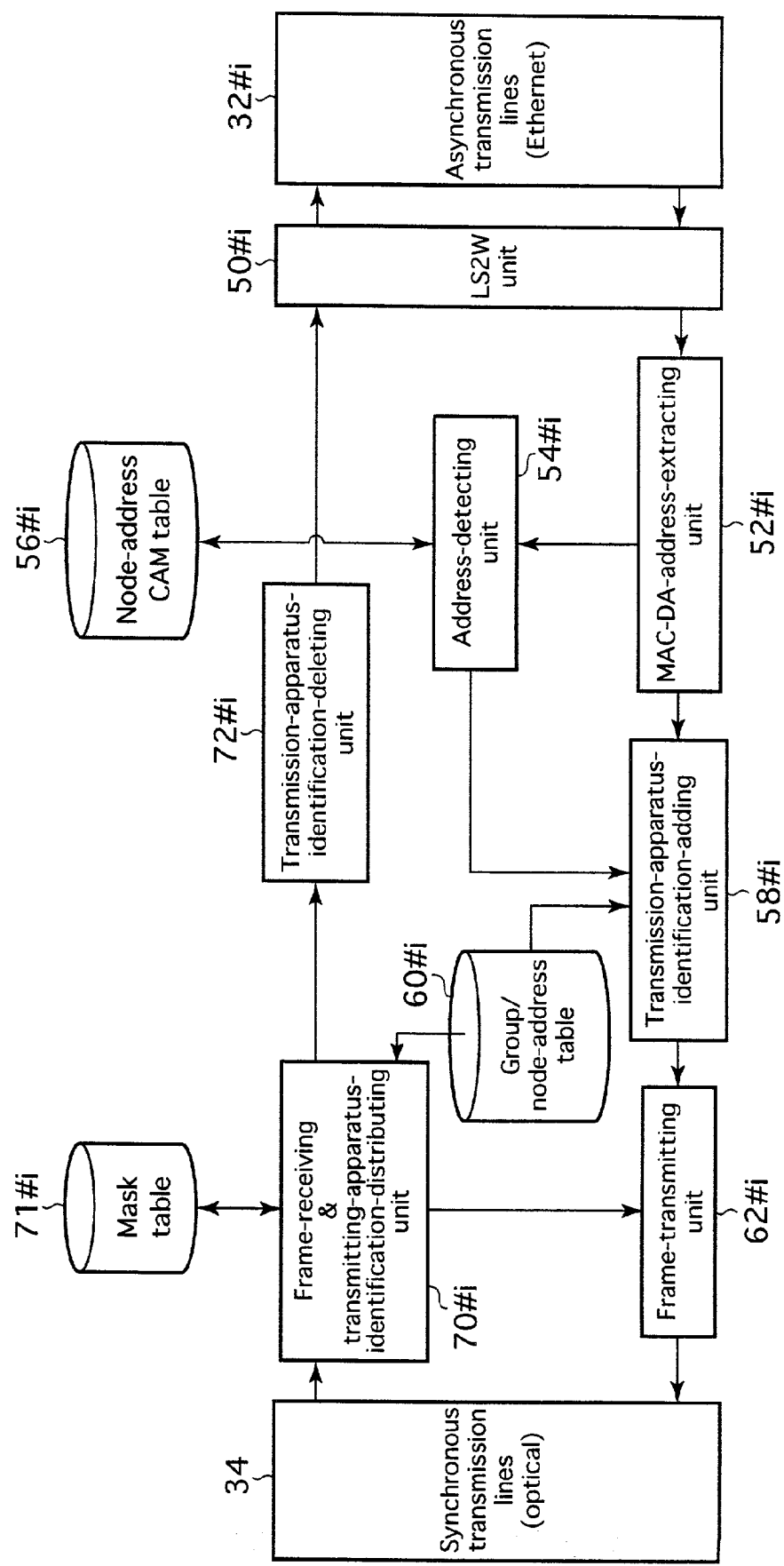
FIG. 3 is a block diagram showing the configuration of a transmission apparatus included in the transmission network shown in FIG. 2.

FIG. 3 is a block diagram showing the configuration of a transmission apparatus 30#i included in the transmission network shown in FIG. 2. As shown in FIG. 3, the transmission apparatus 30#i comprises an L2SW unit 50#i, a MAC-DA-address-extracting unit 52#i, an address-detecting unit 54#i, a node-address CAM table 56#i, a transmission-apparatus-identification-adding unit 58#i, a group-node-address table 60#i, a frame-transmitting unit 62#i, a frame-receiving & transmitting-apparatus-identification-distributing unit 70#i, a mask table 71#i and a transmission-apparatus-identification-deleting unit 72#i. The L2SW unit 50#i has the following functions:

1: Receive a MAC frame from the asynchronous transmission line 32#i and carry out the following pieces of processing:

1-1: Extract the MAC address of a communication destination from the MAC frame. The MAC address of a communication destination is also referred to as a MAC-DA address.

1-2: Form a judgment as to whether or not a terminal having the MAC-DA address is accommodated in the transmission apparatus employing the L2SW unit 50#i and a judgment as to whether or not the transmission is a multiple-address communication.

1-3: Discard the MAC frame if the terminal having the MAC-DA address is accommodated in the transmission apparatus employing the L2SW unit 50#i.

1-4: Output the MAC frame to the MAC-DA-address-extracting unit 52#i if the terminal having the MAC-DA address is not accommodated in the transmission apparatus employing the L2SW unit 50#i or the communication is not a multiple-address communication.

2: Output a MAC frame to the asynchronous transmission line 32#i if the MAC frame is received from the transmission-apparatus-identification-deleting unit 72#i.

When receiving a MAC frame from the L2SW unit 50#i, the MAC-DA-address-extracting unit 52#i extracts the MAC-DA address from the MAC frame and outputs the MAC-DA address to the address-detecting unit 54#i. When receiving the MAC-DA address, the address-detecting unit 54#i carries out the following pieces of processing:

2-1: Use the MAC-DA address as an associative key for searching the node-address CAM table 56#i for the address of a group including the terminal having the MAC-DA address and the node address of a transmission apparatus accommodating the terminal having the MAC-DA address. The address of a group including the terminal having the MAC-DA address is referred to as a DA group address and the node address of a transmission apparatus accommodating the terminal having the MAC-DA address is referred to as a DA node address. A group address is an address assigned to a group used as a unit composing a VLAN. Each of the transmission apparatuses 30#i can be treated as a transmission apparatus pertaining to a group. A node address is an address assigned to each of the transmission apparatuses 30#i. A combination of a group address and a node address is referred to as a transmission-apparatus identification.

Figure 4:
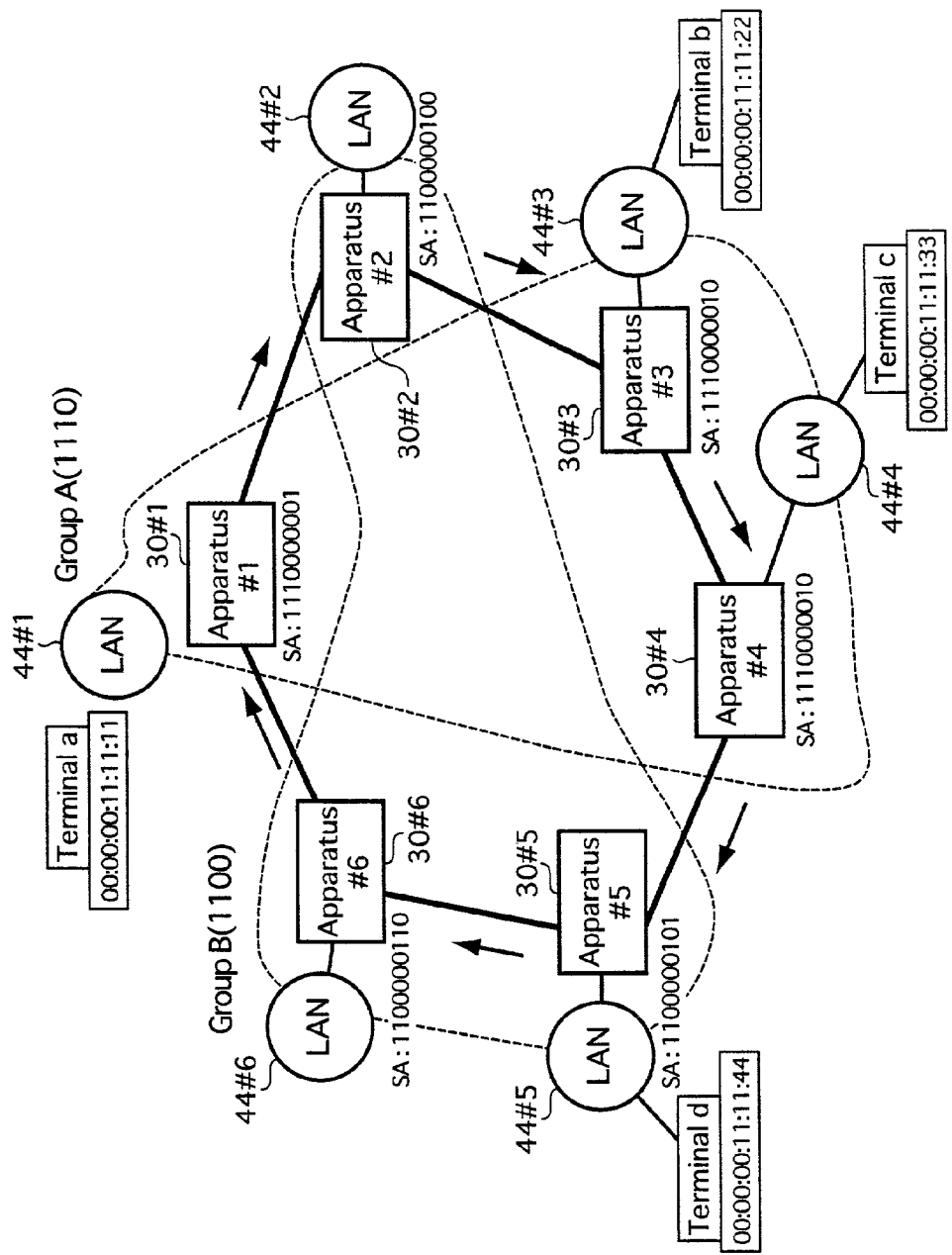
FIG. 4 is a diagram showing typical construction of a VLAN in the transmission network.

FIG. 4 is a diagram showing typical construction of a VLAN in the transmission network. As shown in FIG. 4, the transmission network comprises a plurality of groups such as groups A and B. Group A comprises LANs 44#1, 44#3 and 44#4 whereas group B comprises LANs 44#2, 44#5 and 44#6. Terminals 40#ij accommodated by a LAN 44#i are said to pertain to a group including the LAN 44#i. Each group has a unique group address assigned thereto. In the transmission network shown in FIG. 4, the unique group address assigned to group A is 1110 and the unique group address assigned to group B is 1100.

2-2: Output the acquired DA group address and the acquired DA node address to the transmission-apparatus-identification-adding unit 58#i.

FIG. 5 is a diagram showing the configuration of the node-address CAM table 56#i used in the transmission apparatus shown in FIG. 3. As shown in FIG. 5, by using a terminal MAC address as an associative key, the node-address CAM table 56#i can be searched for a transmission-apparatus identification comprising the address of a group including the terminal and the node address of the group transmission apparatus accommodating the terminal. The addresses are cataloged in the node-address CAM table 56#i by executing the steps of:

letting the operator enter the addresses to a management terminal not shown;

letting the management terminal transmit the addresses to the transmission apparatus 30#i; and letting the transmission apparatus 30#i catalog the addresses in the node-address CAM table 56#i.

What are cataloged are the MAC address of a terminal to communicate with and a multiple-address-communication address. In the case of a multiple-address-communication address, the identification of a transmission apparatus comprises the address of a group containing the transmission apparatus as a group address and a node address of all "1"s to indicate a multiple-address communication in the group. The node-address CAM table 56#i is maintained to reflect addition and deletion of a terminal.

When receiving a MAC frame from the L2SW unit 50#i, the transmission-apparatus-identification-adding unit 58#i carries out the following pieces of processing:

1: Acquire the address of a group containing the transmission apparatus 30#i employing the transmission-apparatus-identification-adding unit 58#i and a node address assigned to the transmission apparatus 30#i from the address-detecting unit 54#i. The address of a group containing the transmission apparatus 30#i employing the transmission-apparatus-identification-adding unit 58#i and the node address assigned to the transmission apparatus 30#i are referred to as an SA group address and an SA node address respectively. The SA group address and the SA node address constitute the identification of the transmission apparatus 30#i.

2: Receive a DA group address and a DA node address from the address-detecting unit 54#i.

3: Delete unnecessary portions of the header from the MAC frame.

4: Create an IT frame comprising a header specifying the length of the MAC frame excluding the deleted unnecessary portions.

5: Split the IT frame into pieces of cell data, which each have a fixed length.

6: Create a header including information such as the identification of the SA transmission apparatus, the identification of the DA transmission apparatus and LIFE for each piece of cell data.

7: Create an IT cell comprising the created header and the cell data.

8: Output the IT cell to the frame-transmitting unit 62#i.

Figure 6:
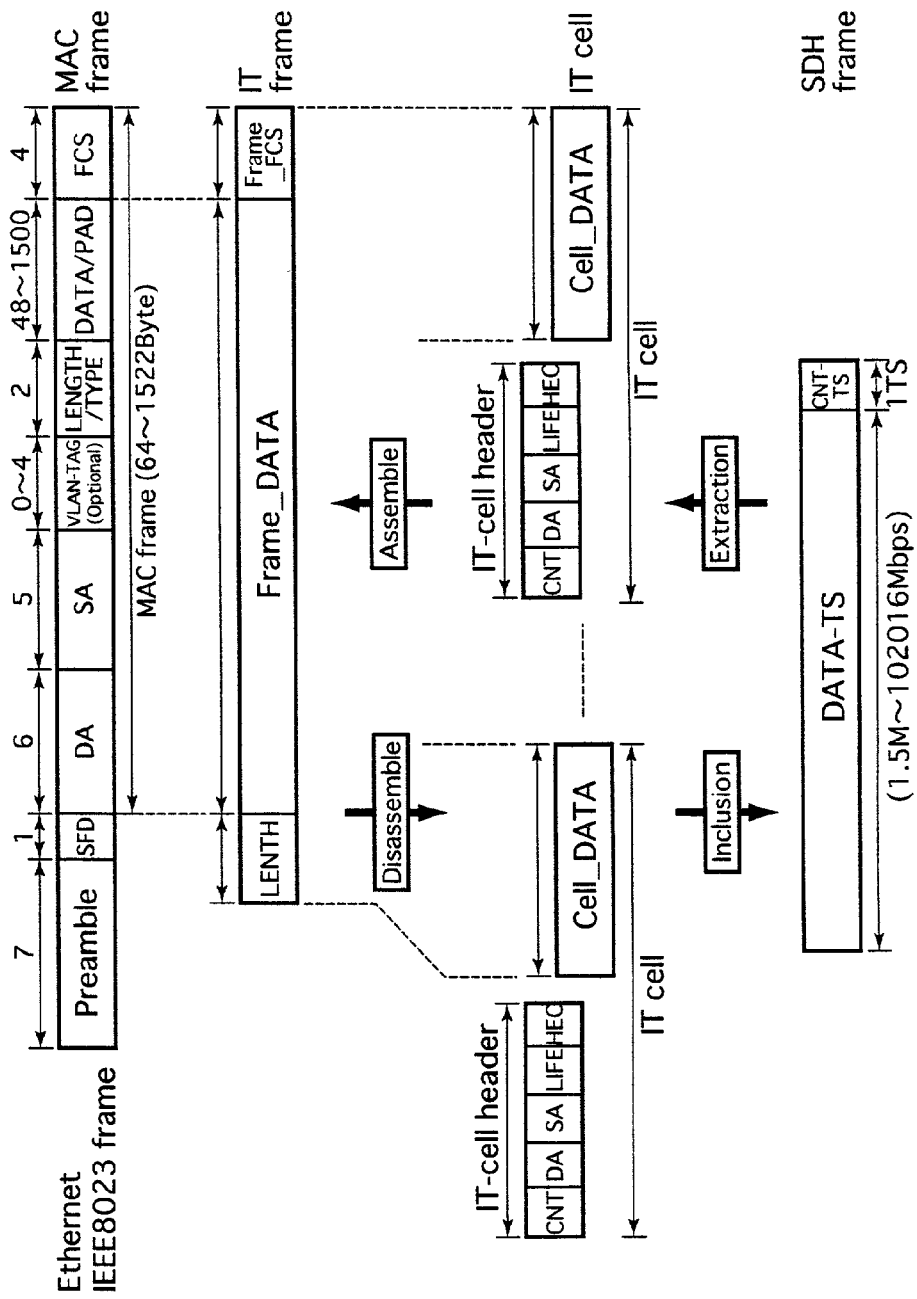
FIG. 6 is a diagram showing the formats of a MAC frame, an IT frame and an IT cell.

FIG. 6 is a diagram showing the formats of a MAC frame, an IT frame and an IT cell. As shown in FIG. 6, the IT frame is a frame obtained by deleting a preamble serving as a header, an SFD and an FCS at the end of the MAC frame from the MAC frame and adding information on a post-deletion length as well as an FCS at the end of the resulting frame. An IT cell comprises pieces of cell data having a fixed length and a cell header. That is to say, each piece of cell data is a fixed-length division of data of the IT frame. The cell header comprises CNT, an SA transmission-apparatus identification (SA), a DA transmission-apparatus identification (DA), LIFE and HEC. CNT is control bits used for specifying the position of a division cell. That is to say, the CNT specifies whether the division cell is the beginning cell, an intermediate cell, an end cell or a single cell. The format of the DA transmission-apparatus identification indicates how the communication is carried out.

FIG. 7 is a diagram showing a method of specifying the identification of a DA transmission apparatus. As shown in FIG. 7, the DA transmission-apparatus identification may indicate one of the following:

1: A specific transmission apparatus pertaining to a specific group: In this case, the communication is a 1-to-1 communication between a terminal and another terminal pertaining to the same group or another group. The identification of the DA transmission apparatus comprises the address of a DA group including a transmission apparatus accommodating a terminal serving as the destination of the communication and the DA node address of the transmission apparatus.

2: All transmission apparatuses pertaining to a specific group: A communication specifying such defined transmission apparatuses is referred to as a multiple-address communication targeted at all transmission apparatuses pertaining to the specific group. In this case, the identification of the DA transmission apparatus comprises the address of the specific DA group including transmission apparatuses each accommodating terminals each serving as the destination of the communication and a DA node address of all "1"s.

3: A transmission apparatus having a specific address in the same group or another group: In this case, the identification of the DA transmission apparatus comprises a DA group address of all "1"s and a node address used as the specific address of a transmission apparatus.

The SA in the IT-cell header is the identification of an SA transmission apparatus.

The group-node-address table 60#i includes the address of a group including the transmission apparatus 30#i and the node address of the transmission apparatus 30#i. The frame-transmitting unit 62#i puts an IT frame output by the transmission-apparatus-identification-adding unit 58#i and the frame-receiving & transmitting-apparatus-identification-distributing unit 70#i in an SDH frame and transmits the SDH frame to a synchronous transmission line 34. The frame-receiving & transmitting-apparatus-identification-distributing unit 70#i carries out the following pieces of processing.

1: Receive an SDH frame transmitted to a synchronous transmission line 34.

2: Extract an IT cell from the SDH frame.

3: Check the HEC included in the header of the IC cell and discard the IT cell if the HEC is erroneous.

4: Discard the IT cell if the LIFE is 0.

5: Acquire a group mask from the mask table 71#i, find valid-bit lengths of a group address and a node address and acquire a DA group address and a DA node address from the identification of the DA transmission apparatus.

6: Determine that a received IT cell is a cell to be transmitted to the asynchronous transmission line 32#i for the following cases:

6-a: The DA matches the address of a group including the transmission apparatus 30#i employing the frame-receiving & transmitting-apparatus-identification-distributing unit 70#i and the node address of the transmission apparatus 30#i.

6-b: The bits of the DA group address are all "1"s and the DA node address matches the node address of the transmission apparatus 30#i employing the frame-receiving & transmitting-apparatus-identification-distributing unit 70#i.

6-c: The bits of the DA node address are all "1"s and the DA group address matches the address of a group including the transmission apparatus 30#i employing the frame-receiving & transmitting-apparatus-identification-distributing unit 70#i.

7: Determine that a received IT cell is a cell to be relayed to a synchronous transmission line 34 for the following cases:

7-d: The bits of the DA group address are all "1"s.
7-e: The bits of the DA node address are all "1"s
7-f: The condition of case 6-a is not satisfied.

8: Output a received IT cell to the transmission-apparatus-identification-deleting unit 72#i if the received IT cell is determined to be a cell to be accepted.

9: Decrement the LIFE of a received IT cell and output the IT cell to the frame-transmitting unit 62#i if the received IT cell is determined to be a cell to be relayed.

Figure 8:
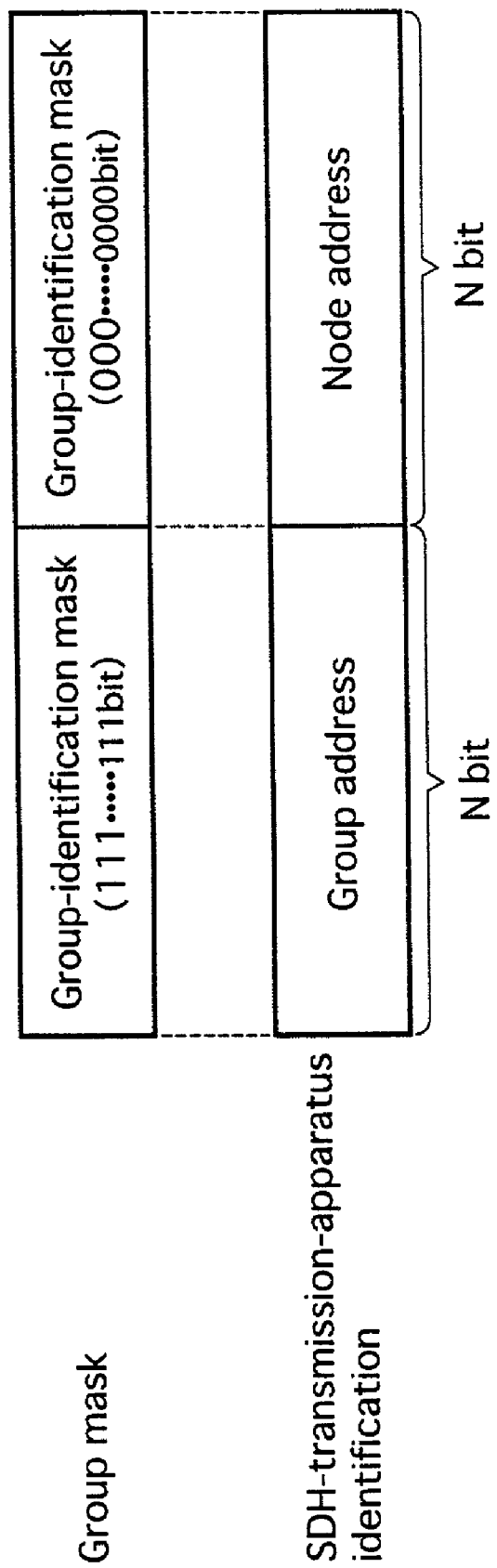
FIG. 8 is a diagram showing the configuration of a mask table used in the transmission apparatus shown in FIG. 3.

FIG. 8 is a diagram showing the configuration of a mask table 71#i used in the transmission apparatus 30#i shown in FIG. 3. As shown in FIG. 8, the mask table 71#i includes group masks. A group mask is a fixed-length bit pattern indicating how many bits constitute a group address of a transmission-apparatus identification resulting from concatenation of the group address and a node address. High-order bits of the group-mask bit pattern are consecutive "1"s corresponding to the bits of the group address.

The transmission-apparatus-identification-deleting unit 72#i has the following functions.

1: Assemble an IT frame based on IT cells as shown in the FIG. 6 when receiving the IT cells from the group-node-address table 60#i.
2: Check the FCS of the IT frame.
3: Create a MAC frame from the IT frame.
4: Output the MAC frame to the L2SW unit 50#i.

The operation of the transmission network shown in FIG. 2 is explained as follows.

In this embodiment, the transmission apparatus 30#i has a transmission-apparatus identification consisting of 10 bits. The size of a group mask is 4 bits corresponding to the highest-order bits of the transmission-apparatus identification. Group A has an identification of "1110" whereas group B has an identification of "1100". Each of the groups includes 6 SDH transmission apparatuses 30#i where i=1 to 6 having node addresses of "000001" to "000110" respectively.

1: 1-to-1 Communication Within the Same Group

The following description explains a typical 1-to-1 communication within group A between the terminal 40#11 accommodated by the transmission apparatus 30#1 pertaining to group A and the terminal 40#41 accommodated by the transmission apparatus 30#4 also pertaining to group A. In this case, a MAC frame transmitted from the terminal 40#11 to the terminal 40#41 is received by the asynchronous transmission line 32#1 connected to the transmission apparatus 30#i. The L2SW unit 50#1 employed in the transmission apparatus 30#1 is informed that a MAC frame has been received. The L2SW unit 50#i recognizes that a communication-destination MAC address (MAC-DA) in the MAC frame is not the address of a terminal accommodated by the transmission apparatus 30#i. In this case, the L2SW unit 50#1 outputs the MAC frame to the MAC-DA-address-extracting unit 52#i. The MAC-DA-address-extracting unit 52#i extracts the MAC-DA address from the MAC frame and supplies the address to the address-detecting unit 54#1 and the transmission-apparatus-identification-adding unit 58#1. Assume that the extracted MAC-DA address is address (00:00:11:11:33) assigned to the terminal 40#41. The address-detecting unit 54#1 uses the MAC-DA address as an associative key to search the node-address CAM table 56#1 for a transmission-apparatus identification corresponding to the MAC-DA address. The address-detecting unit 54#1 supplies the transmission-apparatus identification, that is, the identification of the transmission apparatus 30#4 accommodating the terminal 40#41, to the transmission-apparatus-identification-adding unit 58#1. In this case, a DA-transmission-apparatus identification of "1110000011" is supplied to the transmission-apparatus-identification-adding unit 58#1.

The transmission-apparatus-identification-adding unit 58#1 creates an IT frame having a fixed length from the MAC frame. The IT frame comprises IT cells each including cell data with a fixed length and a IT-cell header. The IT-cell header has information such as CNT, DA, SA, LIFE and HEC. The SA and the DA are the identifications of SA and DA transmission apparatuses respectively. The IT cells are supplied to the frame-transmitting unit 62#1. In this example, the identifications of DA and SA transmission apparatuses are "1110000011" and "1100000001" respectively. The frame-transmitting unit 62#1 puts the IT cells in an SDH frame and outputs the SDH frame to the synchronous transmission line 34. The SDH frame output to the synchronous transmission line 34 is received by the transmission apparatus 30#2. The frame-receiving & transmitting-apparatus-identification-distributing unit 70#2 employed in the transmission apparatus 30#2 receives the SDH frame and extracts the IT cells from the frame. The HEC in the IT-cell header of each IT cell is examined and, if the HEC is erroneous, the IT cell is discarded. From information included in the IT-cell header of an IT cell, the frame-receiving & transmitting-apparatus-identification-distributing unit 70#2 forms a judgment as to whether to accept, relay or discard the IT cell in accordance with the following judgment criterion.

Figure 9:
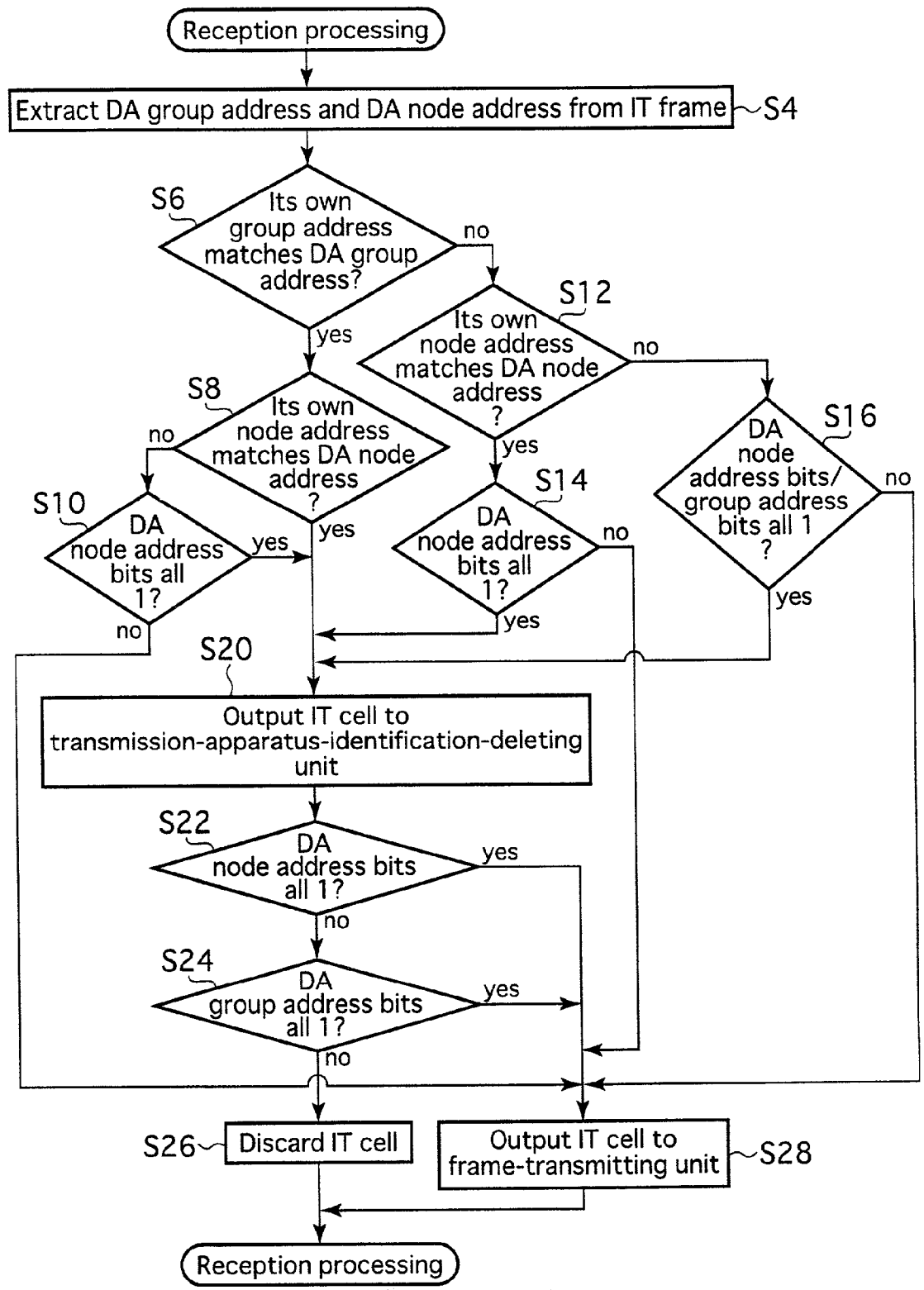
FIG. 9 shows a flowchart representing IT-cell reception, relaying and discarding processes.

FIG. 9 shows a flowchart representing IT-cell reception, relaying and discarding processes. As shown in the figure, the flowchart begins with a step S4 at which a DA group address and a DA node address are extracted from an IT cell. Then, the flow of the process goes on to a step S6 to form a judgment as to whether or not the extracted DA group address matches the address of a group including the transmission apparatus 30#i employing the frame-receiving & transmitting-apparatus-identification-distributing unit 70#i. In this case, i=2. If the extracted DA group address matches the address of the group, the flow of the process goes on to a step 8. If the extracted DA group address does not match the address of the group, on the other hand, the flow of the process goes on to a step 10. At the step S8, the extracted DA node address is examined to form a judgment as to whether or not the extracted DA node address matches the node address of the transmission apparatus 30#i employing the frame-receiving & transmitting-apparatus-identification-distributing unit 70#i. If the extracted DA node address does not match the node address of the transmission apparatus 30#i employing the frame-receiving & transmitting-apparatus-identification-distributing unit 70#i, the flow of process goes on to a step S10. If the extracted DA node address matches the node address of the transmission apparatus 30#i employing the frame-receiving & transmitting-apparatusidentification-distributing unit 70#i, on the other hand, the flow of process goes on to a step S20.

At the step S10, the extracted DA node address is examined to form a judgment as to whether or not the bits of the extracted DA node address are all "1"s. If the bits of the extracted DA node address are all "1"s, the flow of the process goes on to the step S20. If the bits of the extracted DA node address are not all "1"s, on the other hand, the flow of the process goes on to a step S28.

At the step S12, the extracted DA node address is examined to form a judgment as to whether or not the extracted DA node address matches the node address of the transmission apparatus 30#i employing the frame-receiving & transmitting-apparatus-identification-distributing unit 70#i. If the extracted DA node address matches the node address of the transmission apparatus 30#i employing the frame-receiving & transmitting-apparatus-identification-distributing unit 70#i, the flow of process goes on to a step S14. If the extracted DA node address does not match the node address of the transmission apparatus 30#i employing the frame-receiving & transmitting-apparatus-identification-distributing unit 70#i, on the other hand, the flow of process goes on to a step S16. At the step S14, the extracted DA node address is examined to form a judgment as to whether or not the bits of the extracted DA node address are all "1"s. If the bits of the extracted DA node address are all "1"s, the flow of the process goes on to the step S20. If the bits of the extracted DA node address are not all "1"s, on the other hand, the flow of the process goes on to a step S28. At the step S16, the extracted DA node address and the extracted DA group address are examined to form a judgment as to whether or not the bits of the extracted DA node address or the extracted group address are all "1"s. If the bits of the extracted DA node address or the extracted group address are all "1"s, the flow of the process goes on to the step S20. If the bits of the extracted DA node address and the extracted DA group address are not all "1"s, on the other hand, the flow of the process goes on to the step S28.

At the step S20, the IT cell is output to the transmission-apparatus-identification-deleting unit 72#2. The flow of the process then goes on to a step S22 to form a judgment as to whether or not the bits of the extracted DA group address or the extracted group address are all "1"s. If the bits of the extracted DA group address or the extracted group address are all "1"s, the flow of the process goes on to the step S28. If the bits of the extracted DA group address or the extracted group address are not all "1"s, on the other hand, the flow of the process goes on to a step S24.

At the step S24, the bits of the extracted DA group address are examined to form a judgment as to whether or not the bits of the extracted DA group address are all "1"s. If the bits of the extracted DA group address are not all "1"s, the flow of the process goes on to a step S26. If the bits of the extracted DA group address are all "1"s, on the other hand, the flow of the process goes on to the step S28. At the step S26, the IT cell is discarded. At the step S28, the IT cell is supplied to the frame-transmitting unit 62#2. In this case, the frame-receiving & transmitting-apparatus-identification-distributing unit 70#2 determines that the IT cell is not an IT cell destined for the transmission apparatus 30#2 employing the frame-receiving & transmitting-apparatus-identification-distributing unit 70#2 and outputs the IT cell to the frame-transmitting unit 62#2 because both the DA group address and the DA node address are not the address of the group including the transmission apparatus employing the frame-receiving & transmitting-apparatus-identification-distributing unit 70#2 and the node address of the transmission apparatus respectively. The frame-transmitting unit 62#2 puts the IT cell received from the frame-receiving & transmitting-apparatus-identification-distributing unit 70#2 in an SDH frame and outputs the SDH frame to a synchronous transmission line 34.

The SDH frame output to the synchronous transmission line 34 is received by the transmission apparatus 30#3. In accordance with the flowchart described above, the frame-receiving & transmitting-apparatus-identification-distributing unit 70#3 employed in the transmission apparatus 30#3 accepts, relays or discards the IT cell put in the SDH frame. In this case, the DA group address matches the address of a group including the transmission apparatus 30#3, but the DA node address does not match the node address of the transmission apparatus 30#3. Thus, the frame-receiving & transmitting-apparatus-identification-distributing unit 70#3 decides to relay the IT cell. To be more specific, the IT cell is put in an SDH frame which is output to a synchronous transmission line 34 by way of the frame-transmitting unit 62#3.

The SDH frame output to the synchronous transmission line 34 is received by the transmission apparatus 30#4. In accordance with the flowchart described above, the frame-receiving & transmitting-apparatus-identification-distributing unit 70#4 employed in the transmission apparatus 30#4 accepts, relays or discards the IT cell put in the SDH frame. In this case, both the DA group address and the DA node address match the address of the group including the transmission apparatus employing the frame-receiving & transmitting-apparatus-identification-distributing unit 70#2 and the node address of the transmission apparatus respectively. Thus, the frame-receiving & transmitting-apparatus-identification-distributing unit 70#4 decides to accept the IT cell, outputting the IT cell to the transmission-apparatus-identification-deleting unit 72#4. The transmission-apparatus-identification-deleting unit 72#4 assembles an IT frame from IT cells and carries out an FCS check. Then, a MAC frame is created from the IT frame and output to the L2SW unit 50#4. The L2SW unit 50#4 verifies that a terminal 40#41, to which a MAC-DA address included in the MAC frame is assigned, is accommodated by the asynchronous transmission line 32#4. Finally, the L2SW unit 50#4 outputs the MAC frame to the asynchronous transmission line 32#4.

2: Multiple-Address Communication in the Same Group

The following description explains a case in which the terminal 40#11 accommodated by the transmission apparatus 30#1 included in group A carries out an intra-group communication within group A. The terminal 40#11 transmits a MAC frame destined for all terminals in group A. A MAC frame typically has a DA-MAC address, which indicates that the MAC frame is a multicasted or broadcasted frame. In the transmission apparatus 30#1, the MAC frame is received by the asynchronous transmission line 32#1 and passed on to the L2SW unit 50#1. The L2SW unit 50#1 verifies that the MAC address (MAC-DA) of the communication-destination indicates that the communication is a multiple-address communication, and thus outputs the MAC frame to the MAC-DA-address-extracting unit 52#1. The MAC-DA-address-extracting unit 52#1 extracts the MAC-DA address from the MAC frame, and supplies the address to the transmission-apparatus-identification-adding unit 58#1 and the address-detecting unit 54#1. The address-detecting unit 54#1 uses the MAC-DA address as an associative key to search the node-address CAM table 56#1 for a transmission-apparatus identification corresponding to the MAC-DA address. Since the transmission-apparatus identification found in the search is a transmission-apparatus identification of a multicast/broadcast address, the group address of the identification is the group address of group A and the node address of the identification is an ALL-"1" node address indicating all terminals included in group A. To be more specific, the transmission-apparatus identification is "1110111111" and is reported to the transmission-apparatus-identification-adding unit 58#1.

As described above, the transmission-apparatus-identification-adding unit 58#1 creates an IT cell from the MAC frame, and outputs the IT cell to the frame-transmitting unit 62#1. In the header of the IT cell, a DA transmission-apparatus identification of "1110111111" and an SA transmission-apparatus identification of "11100000001" are set. The frame-transmitting unit 62#1 puts the IT cell in an SDH frame, and outputs the SDH frame to the synchronous transmission line 34.

The SDH frame output to the synchronous transmission line 34 is received by the transmission apparatus 30#2. In accordance with the flowchart described above, the frame-receiving & transmitting-apparatus-identification-distributing unit 70#2 employed in the transmission apparatus 30#2 forms a judgment as to whether to accept, relay or discard the IT cell put in the SDH frame. Since the DA group address of "1110" is different from an address of "1100" assigned to a group including the transmission apparatus 30#2, the frame-receiving & transmitting-apparatus-identification-distributing unit 70#2 decides to relay the SDH frame. To put it in detail, the SDH frame is output to the synchronous transmission line 34 by way of the frame-transmitting unit 62#2.

By the same token, the SDH frame output to the synchronous transmission line 34 is received by the transmission apparatus 30#3. In accordance with the flowchart described above, the frame-receiving & transmitting-apparatus-identification-distributing unit 70#3 employed in the transmission apparatus 30#3 forms a judgment as to whether to accept, relay or discard the IT cell put in the SDH frame. Since the DA group address of "1110" matches an address assigned to a group including the transmission apparatus 30#3 and the DA node address is all "1", the frame-receiving & transmitting-apparatus-identification-distributing unit 70#3 decides to accept and relay the SDH frame. To put it in detail, a MAC frame is output to the asynchronous transmission line 32#3 by way of the transmission-apparatus-identification-deleting unit 72#3 and the L2SW unit 50#3. On the other hand, the SDH frame including the IT cell is transmitted to the synchronous transmission line 34 by way of the frame-transmitting unit 62#3.

In the same way, the SDH frame output to the synchronous transmission line 34 is received by the transmission apparatus 30#4. In accordance with the flowchart described above, the frame-receiving & transmitting-apparatus-identification-distributing unit 70#4 employed in the transmission apparatus 30#4 forms a judgment as to whether to accept, relay or discard the IT cell put in the SDH frame. Since the DA group address of "1110" matches an address assigned to a group including the transmission apparatus 30#4 and the DA node address is all "1", the frame-receiving & transmitting-apparatus-identification-distributing unit 70#4 decides to accept and relay the SDH frame. To put it in detail, a MAC frame is output to the asynchronous transmission line 32#4 by way of the transmission-apparatus-identification-deleting unit 72#4 and the L2SW unit 50#4. On the other hand, the SDH frame including the ITH cell is transmitted to the synchronous transmission line 34 by way of the frame-transmitting unit 62#4.

Likewise, the SDH frame output to the synchronous transmission line 34 is received by the transmission apparatus 30#5. In accordance with the flowchart described above, the frame-receiving & transmitting-apparatus-identification-distributing unit 70#5 employed in the transmission apparatus 30#5 forms a judgment as to whether to accept, relay or discard the IT cell put in the SDH frame. Since the DA group address of "1110" is different from an address of "1100" assigned to a group including the transmission apparatus 30#5, the frame-receiving & transmitting-apparatus-identification-distributing unit 70#5 decides to relay the IT cell. To put it in detail, the SDH frame is output to the synchronous transmission line 34 by way of the frame-transmitting unit 62#5.

Similarly, the SDH frame output to the synchronous transmission line 34 is received by the transmission apparatus 30#6. In accordance with the flowchart described above, the frame-receiving & transmitting-apparatus-identification-distributing unit 70#6 employed in the transmission apparatus 30#6 forms a judgment as to whether to accept, relay or discard the IT cell put in the SDH frame. Since the DA group address of "1110" is different from an address of "1100" assigned to a group including the transmission apparatus 30#6, the frame-receiving & transmitting-apparatus-identification-distributing unit 70#6 decides to relay the IT cell. To put it in detail, the SDH frame is output to the synchronous transmission line 34 by way of the frame-transmitting unit 62#6.

By the same token, the SDH frame output to the synchronous transmission line 34 is received by the transmission apparatus 30#1. In accordance with the flowchart described above, the frame-receiving & transmitting-apparatus-identification-distributing unit 70#1 employed in the transmission apparatus 30#1 forms a judgment as to whether to accept, relay or discard the IT cell put in the SDH frame. Since the IT cell has been circulated through all the transmission apparatuses 30#i, LIFE=0. In this case, the IT cell is discarded.

3: Inter-Group Communication

As an example, the following description explains a case in which the terminal 40#11 accommodated by the transmission apparatus 30#1 pertaining to group A carries out a 1-to-1 inter-group communication with the terminal 40#51 accommodated by the transmission apparatus 30#5 pertaining to group B. A MAC frame, which is transmitted from the terminal 40#11 and destined for the terminal 40#51, is received by the asynchronous transmission line 32#1 connected to the transmission apparatus 30#1. The reception of the MAC frame is reported to the L2SW unit 50#1. The L2SW unit 50#1 verifies that the communication-destination MAC address (MAC-DA) included in the MAC frame indicates that the destination of the transmission is not included in the same group as the source of the transmission. In this case, the L2SW unit 50#1 passes on the MAC frame to the MAC-DA-address-extracting unit 52#1. The MAC-DA-address-extracting unit 52#1 extracts the MAC address of the communication-destination from the MAC frame and supplies the address to the address-detecting unit 54#1 and the transmission-apparatus-identification-adding unit 58#1. Assume that the MAC address of the terminal 40#51 serving as the destination of the transmission is (00:00:00:11:11:44).

The address-detecting unit 54#1 uses the MAC-DA address as an associative key to search the node-address CAM table 56#1 for a transmission-apparatus identification corresponding to the MAC-DA address. The address-detecting unit 54#1 supplies the transmission-apparatus identification to the transmission-apparatus-identification-adding unit 58#1. Assume that the transmission-apparatus identification supplied to the transmission-apparatus-identification-adding unit 58#1 is "1100000101". The transmission-apparatus-identification-adding unit 58#1 outputs an IT cell to the frame-transmitting unit 62#1. In the header of the IT cell, a DA transmission-apparatus identification of "1100000101" and an SA transmission-apparatus identification of "1110000001" are set. The frame-transmitting unit 62#1 puts the IT cell in an SDH frame and outputs the SDH frame to the synchronous transmission line 34. The SDH frame output to the synchronous transmission line 34 is received by the transmission apparatus 30#2.

In accordance with the flowchart described above, the frame-receiving & transmitting-apparatus-identification-distributing unit 70#2 employed in the transmission apparatus 30#2 forms a judgment as to whether to accept, relay or discard the IT cell put in the SDH frame. Since the DA transmission-apparatus identification of "1100000001" is different from an identification of "1100000100" assigned to a group including the transmission apparatus 30#2, the frame-receiving & transmitting-apparatus-identification-distributing unit 70#2 decides to relay the SDH frame. To put it in detail, the SDH frame is output to the synchronous transmission line 34 by way of the frame-transmitting unit 62#2.

By the same token, the SDH frame output to the synchronous transmission line 34 is received by the transmission apparatus 30#3. In accordance with the flowchart described above, the frame-receiving & transmitting-apparatus-identification-distributing unit 70#3 employed in the transmission apparatus 30#3 forms a judgment as to whether to accept, relay or discard the IT cell put in the SDH frame. Since the DA group address in the identification of the DA transmission apparatus is different from an address assigned to a group including the transmission apparatus 30#3, the frame-receiving & transmitting-apparatus-identification-distributing unit 70#3 decides to relay the SDH frame. To put it in detail, the SDH frame is output to the synchronous transmission line 34 by way of the frame-transmitting unit 62#3.

In the same way, the SDH frame output to the synchronous transmission line 34 is received by the transmission apparatus 30#4. In accordance with the flowchart described above, the frame-receiving & transmitting-apparatus-identification-distributing unit 70#4 employed in the transmission apparatus 30#4 forms a judgment as to whether to accept, relay or discard the IT cell put in the SDH frame. Since the DA group address in the identification of the DA transmission apparatus is different from an address assigned to a group including the transmission apparatus 30#4, the frame-receiving & transmitting-apparatus-identification-distributing unit 70#4 decides to relay the SDH frame. To put it in detail, the SDH frame is output to the synchronous transmission line 34 by way of the frame-transmitting unit 62#4.

Similarly, the SDH frame output to the synchronous transmission line 34 is received by the transmission apparatus 30#5. In accordance with the flowchart described above, the frame-receiving & transmitting-apparatus-identification-distributing unit 70#5 employed in the transmission apparatus 30#5 forms a judgment as to whether to accept, relay or discard the IT cell put in the SDH frame. Since the DA transmission-apparatus identification of "1100000001" is the same as an identification of "1100000001" assigned to a group including the transmission apparatus 30#5, the frame-receiving & transmitting-apparatus-identification-distributing unit 70#5 decides to accept and relay the SDH frame. To put it in detail, a MAC frame is output to the asynchronous transmission line 32#5 by way of the transmission-apparatus-identification-deleting unit 72#5 and the L2SW unit 50#5.

In accordance with the embodiment described above, it is no longer necessary to set a router, a bridge and the like for adding information such as a VLAN-Tag at both ends of each transmission apparatus in a large-scale VLAN passing through transmission lines in order to enhance security. Security among groups can thus be constructed at a low cost. It is also no longer necessary to secure separate pathes on SDH lines when distributing information to groups. Thus, transmission-line bands can be utilized effectively.

Second Embodiment

Figure 10:
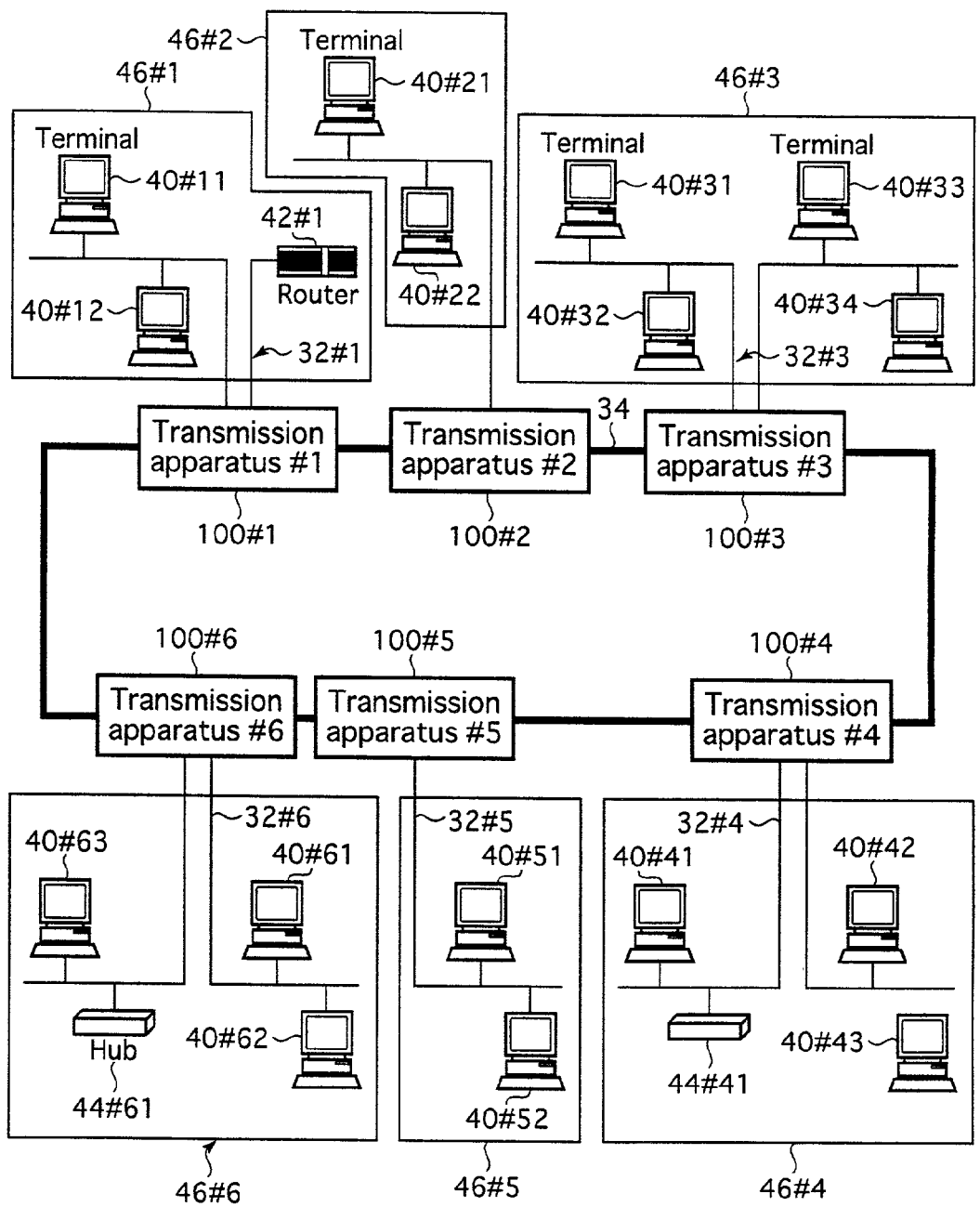
FIG. 10 is a block diagram showing the configuration of a transmission network implemented by a second embodiment of the present invention.

FIG. 10 is a block diagram showing the configuration of a transmission network implemented by a second embodiment of the present invention. The second embodiment configuration elements essentially identical with those employed in the first embodiment shown in FIG. 3 are denoted by the same reference numerals as the latter. The transmission apparatuses 100#i are each different from the transmission apparatus 30#i shown in FIG. 2 as follows:

1: In the case of the first embodiment, the operator sets a transmission-apparatus identification corresponding to a MAC-DA address in a node-address CAM table. In the case of the second embodiment, on the other hand, the transmission apparatus 100#i receives an SDH frame including an IT cell from another transmission apparatus. The IT cell includes the identification of a DA transmission apparatus and a MAC-DA address. The transmission apparatus 100#i receiving the SDH frame executes a transmission-apparatus identification-learning function to catalog the MAC-DA address by associating the MAC-DA address with the identification of the DA transmission apparatus. With such a learning function, it is possible to reduce the amount of labor carried out by the operator to set MAC-DA addresses when the communication network is introduced at an initial time, when a terminal is newly added or moved and when the configuration of a LAN is changed.

2: In the case of the second embodiment, it is possible to carry out a sub-group communication wherein a communication with only some terminals in the group is enabled.

Figure 11:
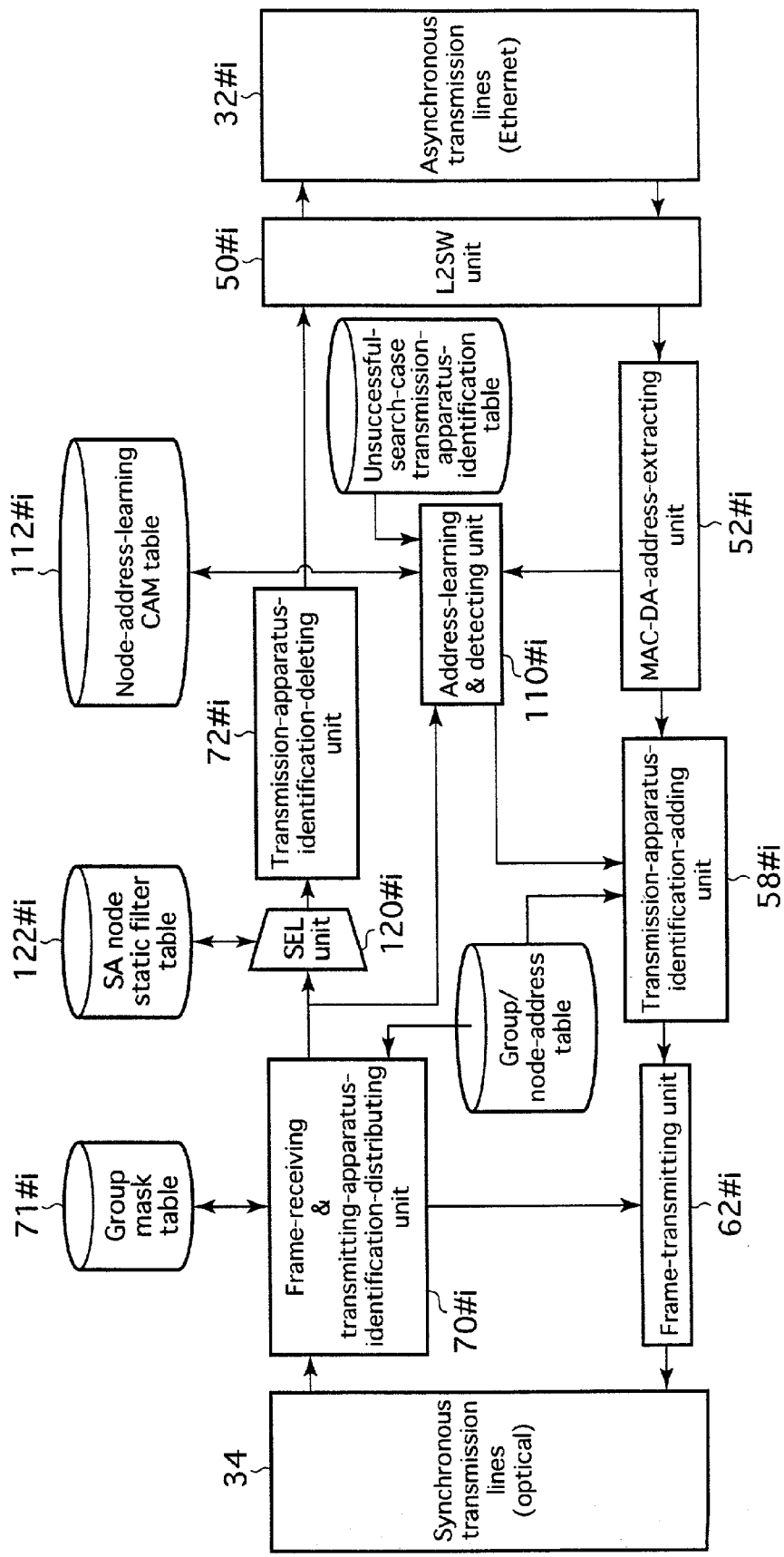
FIG. 11 is a block diagram showing the configuration of a transmission apparatus included in the transmission network shown in FIG. 10.

FIG. 11 is a block diagram showing the configuration of the transmission apparatus 100#i included in the transmission network shown in FIG. 10. Configuration elements of the transmission apparatus 100#i that are essentially identical with those employed in the transmission apparatus 30#i shown in FIG. 2 are denoted by the same reference numerals as the latter. An address-learning & detecting unit 110#i has the following functions related to a process to learn identifications of transmission apparatuses:

1: Extract the identification of an SA transmission apparatus from an IT cell received from the frame-receiving & transmitting-apparatus-identification-distributing unit 70#i and assemble an IT frame from the IT cell.

2: Extract an MAC-SA address from an IT frame.

3: Catalog an SA transmission-apparatus identification in a node-address learning CAM table 112#i for a transmission-apparatus identification-corresponding to the MAC-SA address.

In addition, the address-learning & detecting unit 110#i has the following functions relevant to detection of a transmission-apparatus identification from a DA-MAC address:

1: Use a MAC-DA address as an associative key to search the address-learning CAM table 112#i for a transmission-apparatus identification matching the MAC-DA address when receiving the MAC-DA address from the MAC-DA-address-extracting unit 52#i.

2: Supply the matching transmission-apparatus identification found in the search to the transmission-apparatus-identification-adding unit 58#i.

3: Extract the identification of a transmission apparatus from an unsuccessful-search-case transmission-apparatus identification table 114#i in case no matching transmission-apparatus identification is found in the search and supply the extracted identification of a transmission apparatus to the transmission-apparatus-identification-adding unit 58#i.

FIG. 12 is a diagram showing the configuration of the node-address learning CAM table 112#i used in the transmission apparatus 100#i shown in FIG. 11. As shown in FIG. 12, the node address-learning CAM table 112#i is an associative memory used for storing SDH transmission-apparatus identifications each associated with a terminal MAC address, which can be used as an associative key for searching the address-learning CAM table 112#i. Some of the SDH transmission-apparatus identifications are set by the operator initially at a configuration-definition time when the transmission apparatus 100#i is newly introduced. The SDH transmission-apparatus identifications set by the operator initially typically depend on the operation. The remaining SDH transmission-apparatus identifications are cataloged by the address-learning & detecting unit 110#i in a learning process.

Figure 13A:
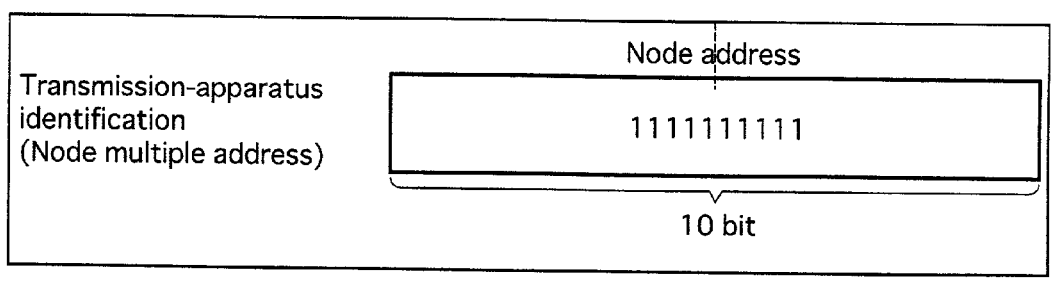
FIG. 13A is a diagram showing the configuration of an unsuccessful-search-case transmission-apparatus identification table used in the transmission apparatus shown in FIG. 11.
Figure 13B:
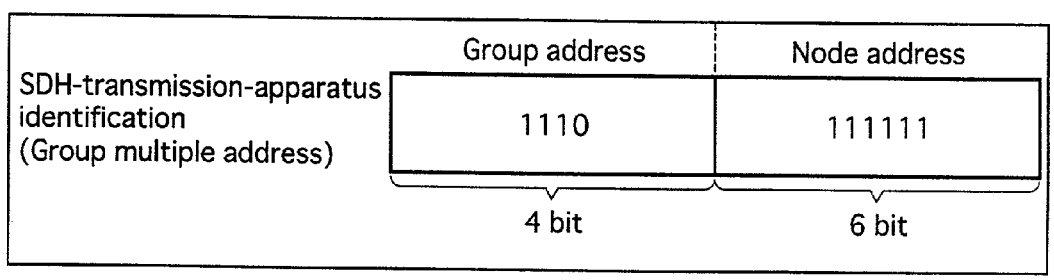
FIG. 13B is a diagram showing the configuration of an unsuccessful-search-case transmission-apparatus identification table used in the transmission apparatus shown in FIG. 11.

FIG. 13A is a diagram showing the configuration of the unsuccessful-search-case transmission-apparatus identification table 114#i used in the transmission apparatus shown in FIG. 11. FIG. 13B is also a diagram showing the configuration of the unsuccessful-search-case transmission-apparatus identification table 114#i used in the transmission apparatus shown in FIG. 11. The unsuccessful-search-case transmission-apparatus identification table 114#i is used for storing a transmission-apparatus identification that is not included in the address-learning CAM table 112#i. This is because the transmission-apparatus identification corresponding to the MAC address is not initially set or cataloged in a learning process in the address-learning CAM table 112#i. The transmission-apparatus address shown in FIG. 13A consists of the address of a group including the transmission apparatus 100#i using the unsuccessful-search-case transmission-apparatus identification table 114#i as a group address, and a node address of all "1"s, which indicate a multiple-address communication within the group. On the other hand, the transmission-apparatus address shown in FIG. 13B consists of a group address of all "1", and a node address of all "1"s, indicating a broadcasting communication to all transmission apparatuses 100#i of all groups.

A SEL unit 120#i has the following functions:

1: Extract an SA node address from an IT cell output by the frame-receiving & transmitting-apparatus-identification-distributing unit 70#i.

2: Examine an SA node static filter table 122#i to determine whether the SA node address has been cataloged in the SA node static filter table 122#i.

2-1: Discard the IT cell if the SA node address has been cataloged in the SA node static filter table 122#i.

2-2: Output the IT cell to the transmission-apparatus-identification-deleting unit 72#i if the address has not been cataloged in the SA node static filter table 122#i.

FIG. 14 is a diagram showing the configuration of the node SA static filter table 122#i used in the transmission apparatus 100#i shown in FIG. 11. The SA node static filter table 122#i is used for storing the node address of each transmission apparatus 100#i that does not carry out a communication. Let transmission apparatuses 100#1, 100#2, 100#5 and 100#6 pertain to group A and transmission apparatuses 100#3 and 100#4 pertain to group B. Assume that the transmission apparatus 100#1 wants to communicate with the transmission apparatuses 100#2, 100#5 and 100#6 and the transmission apparatuses 100#2, 100#5 and 100#6 want to communicate with the transmission apparatus 100#1 only.

In this case, no transmission-apparatus identifications are cataloged in the SA node static filter table 122#1 used in the transmission apparatus 100#1. On the other hand, the identifications of the transmission apparatuses 100#5 and 100#6 are cataloged in the SA node static filter table 122#2 used in the transmission apparatus 100#2. Assume that the address of group A is "1110", the node address of the transmission apparatus 100#5 is "000101" and the node address of the transmission apparatus 100#6 is "000110". In this case, transmission-apparatus identifications of "11100000101" and "111100000110" are cataloged in the SA node static filter table 122#2 used in the transmission apparatus 100#2 as shown in FIG. 14. In addition, the identifications of the transmission apparatuses 100#2 and 100#6 are cataloged in the SA node static filter table 122#5 used in the transmission apparatus 100#5 whereas the identifications of the transmission apparatuses 100#2 and 100#6 are cataloged in the SA node static filter table 122#6 used in the transmission apparatus 100#6. Thus, the transmission apparatus 100#1 is capable of communicating with all the transmission apparatuses 100#2, 100#5 and 100#6 included in group A whereas the transmission apparatus 100#2, 100#5 and 100#6 are capable of communicating with the transmission apparatus 100#1 only.

The operation of the transmission network shown in FIG. 10 is explained as follows.

Figure 15:
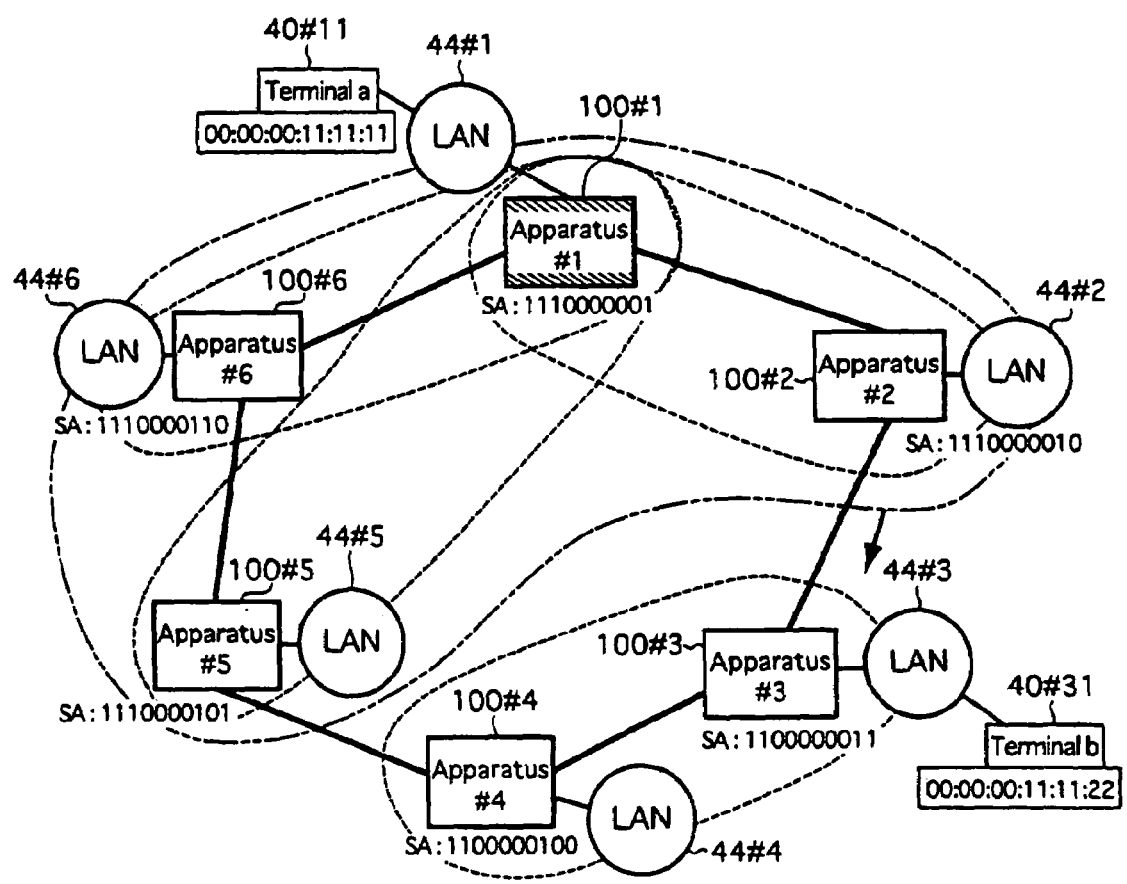
FIG. 15 is a diagram showing typical construction of a VLAN in the transmission network.
Figure 16:
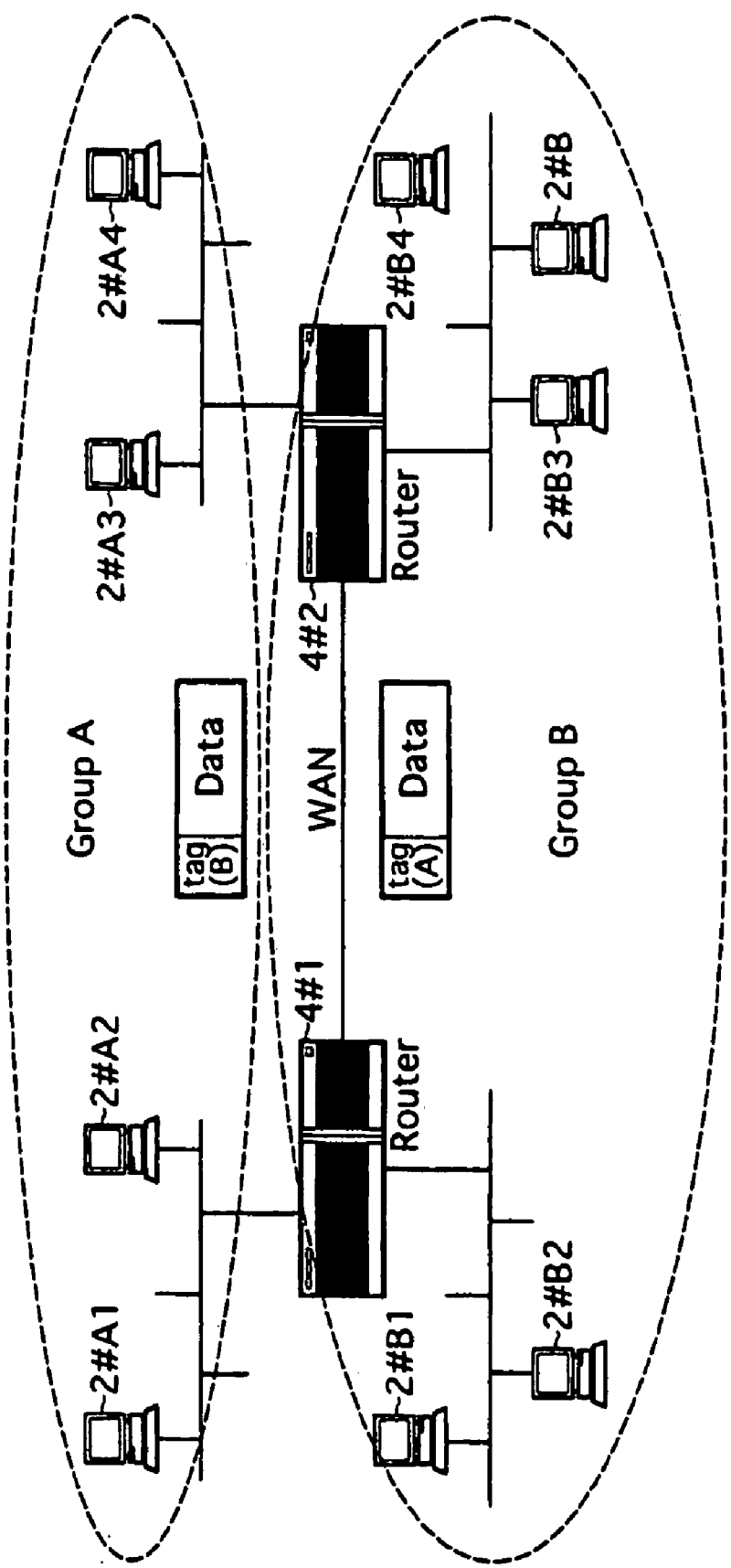
FIG. 16 is a diagram showing typical construction of a VLAN in the Ethernet.
Figure 17:
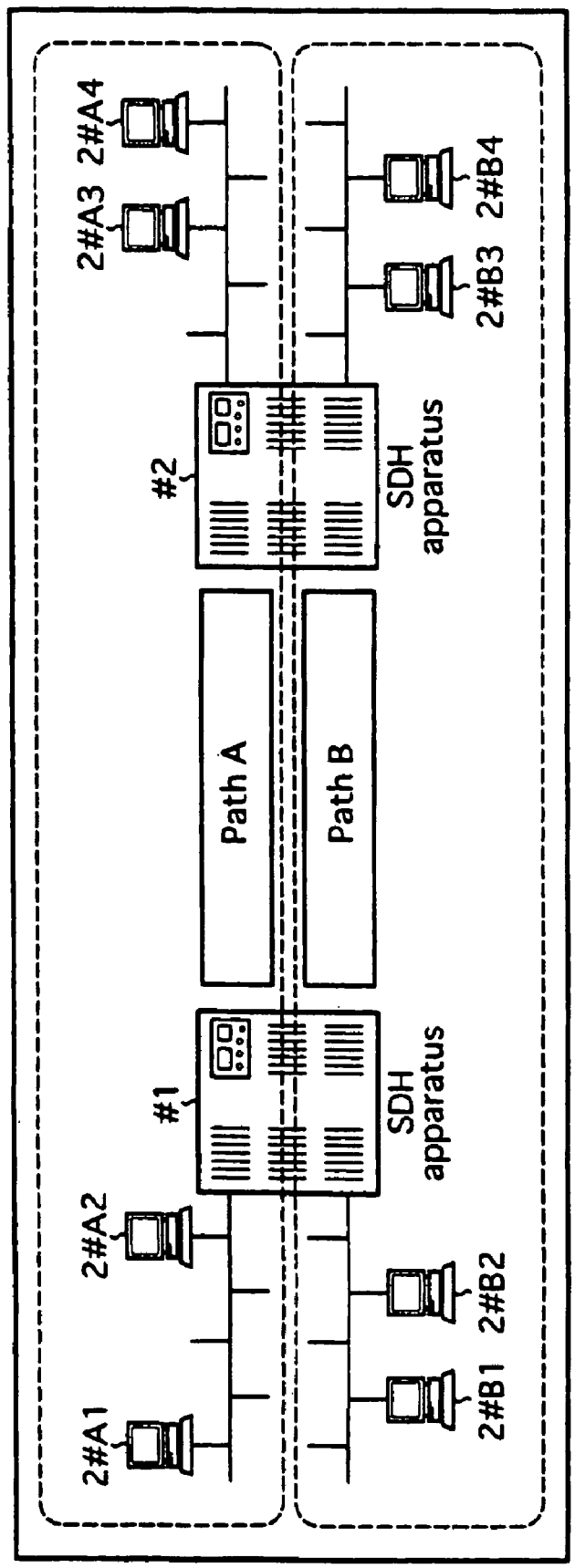
FIG. 17 is a diagram showing typical construction of a VLAN in an SDH transmission apparatus.

FIG. 15 is a diagram showing typical construction of a VLAN in the transmission network. As shown in FIG. 15, the transmission network comprises groups A and B. Group A comprises the transmission apparatus 100#1, 100#2, 100#5 and 100#6 while group B comprises the transmission apparatus 100#3 and the transmission apparatus 100#4. The address of group A is "1110" and the address of group B is "1100".

1: Learning of DA Transmission-Apparatus Identifications

The following description explains a case in which the transmission apparatus 100#1 carries out a process of learning transmission-apparatus identifications related to the terminal 40#21 accommodated by the transmission apparatus 100#2. A MAC frame transmitted from the terminal 40#21 and destined for the terminal 40#11 is received by the asynchronous transmission line 32#2 and reported to the L2SW unit 50#2 employed in the transmission apparatus 100#2. The L2SW unit 50#2 verifies that the communication-destination MAC address (MAC-DA) included in the MAC frame indicates that the destination of the transmission is not accommodated by the transmission apparatus 100#2. In this case, the L2SW unit 50#2 passes on the MAC frame to the MAC-DA-address-extracting unit 52#2. The MAC-DA-address-extracting unit 52#2 extracts the MAC-DA address of the communication-destination from the MAC frame, and supplies the address to the address-learning & detecting unit 110#2. The L2SW unit 50#2 supplies the MAC frame to the transmission-apparatus-identification-adding unit 58#2.

The address-learning & detecting unit 110#2 uses the MAC-DA address as an associative key to search the address-learning CAM table 112#2 for a transmission-apparatus identification matching the MAC-DA address. If a transmission-apparatus identification matching the MAC-DA address is found in the search, the transmission-apparatus identification is reported to the transmission-apparatus-identification-adding unit 58#2. If no transmission-apparatus identification matching the MAC-DA address is found in the search, on the other hand, a transmission-apparatus identification is extracted from the unsuccessful-search-case transmission-apparatus identification table 114#2. For example, an unsuccessful-search-case transmission-apparatus identification showing broadcasting communication is extracted from the unsuccessful-search-case transmission-apparatus identification table 114#2 and supplied to the transmission-apparatus-identification-adding unit 58#2. The transmission-apparatus-identification-adding unit 58#2 sets information such as the identifications of a DA transmission apparatus and an SA transmission apparatus in an IT cell and supplies the IT cell to the frame-transmitting unit 62#2. The frame-transmitting unit 62#2 puts the IT cell in an SDH frame, and outputs the SDH frame to the synchronous transmission line 34. As described above, the SDH frame is transmitted to the transmission apparatus 100#1 by way of the transmission apparatuses 100#2, 100#3, 100#4 and 100#5.

In accordance with the flowchart described above, the frame-receiving & transmitting-apparatus-identification-distributing unit 70#1 employed in the transmission apparatus 100#1 forms a judgment as to whether to accept, relay or discard the IT cell put in the SDH frame. In this case, since the IT cell is destined for the transmission apparatus 100#1, the IT cell is output to the SEL unit 120#1 and the address-learning & detecting unit 110#1. The address-learning & detecting unit 110#1 extracts the identification of an SA transmission apparatus from the IT cell. In this case, the SA transmission apparatus is the transmission apparatus 100#2. An IT frame is assembled from the IT cell and a MAC-SA address is extracted from the IT frame. In this case, the MAC-SA address is the MAC-SA address of the terminal 40#21. The MAC-SA address and the identification of the SA transmission apparatus are cataloged in the address-learning CAM table 112#1.

2: Sub-Group Communication in a Group

The following description explains a case in which the terminal 40#21 accommodated by the transmission apparatus 100#2 included in group A carries out a sub-group communication with the terminals 40#ij where j=1, 2 and so on, which are accommodated by the transmission apparatus 100#1 also pertaining to group A. In the transmission apparatus 100#2, a MAC frame transmitted by the terminal 40#21 and destined for all terminals in the group is received by the asynchronous transmission line 32#2 and passed on to the L2SW unit 50#2. The L2SW unit 50#2 verifies that a communication-destination MAC address included in the MAC frame indicates a multiple-address communication, hence outputting the MAC address to the MAC-DA-address-extracting unit 52#2.

The MAC-DA-address-extracting unit 52#2 extracts a MAC-DA address from the MAC frame and supplies the address to the address-learning & detecting unit 110#2. The L2SW unit 50#2 supplies the MAC frame to the transmission-apparatus-identification-adding unit 58#2. The address-learning & detecting unit 110#2 uses the MAC-DA address as an associative key to search the node address-learning CAM table 112#2 for a transmission-apparatus identification matching the MAC-DA address. If a transmission-apparatus identification matching the MAC-DA address is found in the search, the transmission-apparatus identification is supplied to the transmission-apparatus-identification-adding unit 58#2. As described above, the transmission-apparatus-identification-adding unit 58#2 sets information such as the identifications of a DA transmission apparatus and an SA transmission apparatus in an IT cell, and supplies the IT cell to the frame-transmitting unit 62#2. In this case, the DA transmission apparatus and the SA transmission apparatus are "1110111111" and "1110000010" respectively. As described above, the frame-transmitting unit 62#2 puts the IT cell in an SDH frame and outputs the SDH frame to the synchronous transmission line 34. The SDH frame output to the synchronous transmission line 34 is transmitted to the transmission apparatus 100#3.

In accordance with the flowchart described above, the frame-receiving & transmitting-apparatus-identification-distributing unit 70#3 employed in the transmission apparatus 100#3 forms a judgment as to whether to accept, relay or discard the IT cell put in the SDH frame. In this case, since the DA group address of "1110" is different from an address of "1100" assigned to a group including the transmission apparatus 100#3, the SDH frame is output to the synchronous transmission line 34 by way of the frame-transmitting unit 62#3. The SDH frame output to the synchronous transmission line 34 is received by the transmission apparatus 100#4.

In accordance with the flowchart described above, the frame-receiving & transmitting-apparatus-identification-distributing unit 70#4 employed in the transmission apparatus 100#4 forms a judgment as to whether to accept, relay or discard the IT cell put in the SDH frame. In this case, since the DA group address of "1110" is different from an address of "1100" assigned to a group including the transmission apparatus 100#4, the SDH frame is output to the synchronous transmission line 34 by way of the frame-transmitting unit 62#4. The SDH frame output to the synchronous transmission line 34 is received by the transmission apparatus 100#5.

In accordance with the flowchart described above, the frame-receiving & transmitting-apparatus-identification-distributing unit 70#5 employed in the transmission apparatus 100#5 forms a judgment as to whether to accept, relay or discard the IT cell put in the SDH frame. In this case, since the DA group address of "1110" is the same as the address assigned to a group including the transmission apparatus 100#5 and the DA node address is all "1"s, the frame-receiving & transmitting-apparatus-identification-distributing unit 70#5 makes a decision to receive and relay the IT cell. Thus, the IT cell is output to the SEL unit 120#5, the address-learning & detecting unit 110#5 and the frame-transmitting unit 62#5. The SEL unit 120#5 forms a judgment as to whether or not the SA transmission-apparatus identification has been cataloged in the SA node static filter table 122#5. If the SA transmission-apparatus identification has been cataloged in the SA node static filter table 122#5, the IT cell is discarded. If the SA transmission-apparatus identification has not been cataloged in the SA node static filter table 122#5, on the other hand, the IT cell is output to the transmission-apparatus-identification-deleting unit 72#5. In this case, since the SA transmission-apparatus identification of "1100000010" has been cataloged in the SA node static filter table 122#5, the IT cell is discarded as described above. However, the IT cell is also put in an SDH frame, which is output to the synchronous transmission line 34 by way of the frame-transmitting unit 62#5.

The SDH frame output to the synchronous transmission line 34 is received by the transmission apparatus 100#6. Much like the frame-receiving & transmitting-apparatus-identification-distributing unit 70#5, the frame-receiving & transmitting-apparatus-identification-distributing unit 70#6 employed in the transmission apparatus 100#6 makes a decision to accept and relay the IT cell. Since the SA transmission-apparatus identification of "11100000010" has been cataloged in the SA node static filter table 122#6, the SEL unit 126#6 discards the IT cell. However, the IT cell is also put in an SDH frame, which is output to the synchronous transmission line 34 by way of the frame-transmitting unit 62#6.

The SDH frame output to the synchronous transmission line 34 is received by the transmission apparatus 100#1. Much like the frame-receiving & transmitting-apparatus-identification-distributing unit 70#6, the frame-receiving & transmitting-apparatus-identification-distributing unit 70#1 employed in the transmission apparatus 100#1 makes a decision to accept and relay the IT cell. In this case, however, since the SA transmission-apparatus identification of "1110000010" has not been cataloged in the SA node static filter table 122#1, the SEL unit 120#1 outputs the IT cell to the transmission-apparatus-identification-deleting unit 72#1. The transmission-apparatus-identification-deleting unit 72#1 assembles a MAC frame from the IT cell and outputs the MAC frame to the asynchronous transmission line 32#1 by way of the L2SW unit 50#1.

In the case of the second embodiment, in order to carry out communications between groups, a group address is assigned to each group and a DA group address is set in the identification of a DA transmission apparatus. The node address of each transmission apparatus not carrying out a communication is cataloged in an SA node static filter table used in each transmission apparatus in order to establish a broadcast communication to transmission apparatuses identified by DA transmission-apparatus identifications. Thus, it is possible to carry out an inter-group communication with a group of specific transmission apparatuses. In accordance with the above description, it is possible to provide the following same effects as the first embodiment:

Since there is provided a function to carry out a process of learning the identifications of transmission apparatuses, the work to set the identifications can be eliminated. In addition, even in the case of a communication between sub-groups in a group, it is no longer necessary to link a line by a means such as a back to back connection in a terminal of a communication path.

The present invention is not limited to the details of the above described preferred embodiments. The scope of the present invention is defined by the appended claims and all changes and modifications as fall within the equivalence of the scope of the claims are therefore to be embraced by the invention.

What is claimed is:

1. A digital transmission apparatus, which accommodates a plurality of terminals for exchanging asynchronous frames each including a MAC address, and is used for transmitting said asynchronous frames by putting each of said asynchronous frames in a synchronous frame, said digital transmission apparatus comprising:
   an address table for storing an address of a group including said digital transmission apparatus;
   a header-creating unit for creating a header including a communication-destination transmission-apparatus identification including said address of said group including said digital transmission apparatus;
   a header-adding unit for creating a first frame by adding said header to data of an asynchronous frame received from any one of said terminals;
   a frame-receiving unit for receiving a synchronous frame;
   a distribution unit for extracting a first frame from a synchronous frame received by said frame-receiving unit, comparing a communication-destination transmission-apparatus identification included in a header of said first frame with said address of said group including said digital transmission apparatus and forming a judgment as to whether to relay or accept said first frame in dependence on a result of comparison; and
   a frame-transmitting unit for transmitting a first frame created by said header-adding unit or passed on by said distribution unit by putting said first frame in a synchronous frame.

2. A digital transmission apparatus, which accommodates a plurality of terminals for exchanging asynchronous frames each including a MAC address, and is used for transmitting said asynchronous frames by putting each of said asynchronous frames in a synchronous frame, said digital transmission apparatus comprising:
   a MAC-address table for storing a MAC address of a terminal by associating said MAC address with an address of a group including a digital transmission apparatus accommodating said terminal and a node address of said digital transmission apparatus accommodating said terminal;
   a MAC-DA-address-extracting unit for extracting a communication-destination MAC address set in a MAC header of an asynchronous frame received from any one of said terminals;
   an address-detecting unit for searching said MAC-address table for a group address and a node address that match said communication-destination MAC address;
   an address table for storing said address of said group including said digital transmission apparatus and a node address of said digital transmission apparatus;
   a header-creating unit for determining said address of said group including said digital transmission apparatus and a node address indicating a multiple-address communication in said group for a communication-destination MAC address indicating a multiple-address communication or for determining a group address and a node address that match a communication-destination MAC address for a communication-destination MAC address indicating a 1-to-1 communication and for setting said determined group address and said determined node address in a communication-source transmission-apparatus identification including a communication-source group address and a communication-source node address included in a header;
   a header-adding unit for creating a first frame by adding said header to data of an asynchronous frame received from any one of said terminals;
   a frame-receiving unit for receiving a synchronous frame;
   a distribution unit for extracting a first frame from a synchronous frame received by said frame-receiving unit, comparing a communication-destination transmission-apparatus identification included in a header of said first frame with said address of said group including said digital transmission apparatus and forming a judgment as to whether to relay or accept said first frame in dependence on a result of comparison; and a frame-transmitting unit for transmitting a first frame created by said header-adding unit or passed on by said distribution unit by putting said first frame in a synchronous frame.

3. A digital transmission apparatus according to claim 2, further comprising a MAC-address-learning unit for storing a relation between a communication-destination MAC address and a transmission-apparatus identification on the basis of a communication-source transmission-apparatus identification and a communication-source MAC address, which are included in a first frame put in a synchronous frame received by said frame-receiving unit.

4. A digital transmission apparatus according to claim 2, further comprising an unsuccessful-search-case address table for storing an unsuccessful-search-case transmission-apparatus identification to be used when it is impossible to search for a group address and a node address, which correspond to a MAC address, wherein said header-creating unit uses a transmission-apparatus identification stored in said unsuccessful-search-case address table in case it is impossible to search for a group address and a node address, which correspond to a MAC address.

5. A digital transmission apparatus according to claim 4, wherein:
said unsuccessful-search-case address table is used for storing a transmission-apparatus identification indicating a broadcasting communication to all groups; and
said distribution unit determines to accept a first frame if a communication-destination transmission-apparatus identification of said first frame indicates said broadcasting communication.

6. A digital transmission apparatus according to claim 2, wherein:
the total number of bits included in said communication-destination group address and said communication-destination node address is fixed;
there is further provided a group-mask table for storing a group-address mask pattern indicating the number of bits included in said communication-destination group address; and
said distribution unit forms a judgment as to whether to relay or accept a first frame in dependence of a result of comparison made after a communication-destination group address and a communication-destination node address, which are set in a communication-destination transmission-apparatus identification, are separated from each other by using said group-address pattern.

7. A digital transmission apparatus according to claim 2, further comprising:
a filter table for storing information on transmission apparatuses not entitled to a communication service; and
a filtering unit for discarding a first frame when a transmission apparatus serving as a communication source is determined to be a transmission apparatus not entitled to a communication service as indicated by a result of searching said filter table on the basis of a communication-source transmission-apparatus identification, included in said first frame which is determined to accept by said distribution unit.

8. A digital transmission apparatus according to claim 2, wherein said first frame has a fixed length.

* * * * *